(12) United States Patent
Hamaguchi et al.

(10) Patent No.: US 8,896,296 B2
(45) Date of Patent: Nov. 25, 2014

(54) RELATIVE ANGLE SENSING DEVICE WITH A HINGED CABLE HARNESS COMPONENT

(75) Inventors: Yusuke Hamaguchi, Tochigi (JP); Yohei Hama, Tochigi (JP)

(73) Assignee: Showa Corporation, Saitama (JP)

( * ) Notice: Subject to any disclaimer, the term of this patent is extended or adjusted under 35 U.S.C. 154(b) by 318 days.

(21) Appl. No.: 13/487,727

(22) Filed: Jun. 4, 2012

(65) Prior Publication Data

US 2013/0134966 A1 May 30, 2013

(30) Foreign Application Priority Data

| Nov. 30, 2011 | (JP) | 2011-262716 |
| Nov. 30, 2011 | (JP) | 2011-262717 |
| Apr. 6, 2012 | (JP) | 2012-087448 |
| Apr. 6, 2012 | (JP) | 2012-087449 |

(51) Int. Cl.
*G01B 7/30* (2006.01)

(52) U.S. Cl.
USPC .................. 324/207.21; 324/207.25

(58) Field of Classification Search
USPC ............... 324/207.2, 207.21, 207.25
See application file for complete search history.

(56) References Cited

U.S. PATENT DOCUMENTS

| 5,757,179 A | * | 5/1998 | McCurley et al. | 324/207.2 |
| 2008/0309324 A1 | * | 12/2008 | Stuve et al. | 324/207.2 |

FOREIGN PATENT DOCUMENTS

JP  2007-187589  * 7/2007 ............ G01L 3/10

* cited by examiner

*Primary Examiner* — Jay Patidar
(74) *Attorney, Agent, or Firm* — Leason Ellis LLP

(57) ABSTRACT

A hinged electric cable harness component is provided for use with a relative angle sensing device that has a sensor that is contained in a housing that includes a communication hole. The hinged electric cable harness component includes an electric cable holding member that is fitted with the communication hole of the housing and holds an electric cable. The hinged electric cable harness component also includes an outer component that is arranged at a position outside the electric cable holding member in the communication hole of the housing, and that has, at inside thereof, a penetration hole through which the electric cable passes. The outer component has a pair of opening and closing components that is joined by a hinge and opens and closes the penetration hole by relative rotation.

19 Claims, 21 Drawing Sheets

FIG.8A
FIG.8B
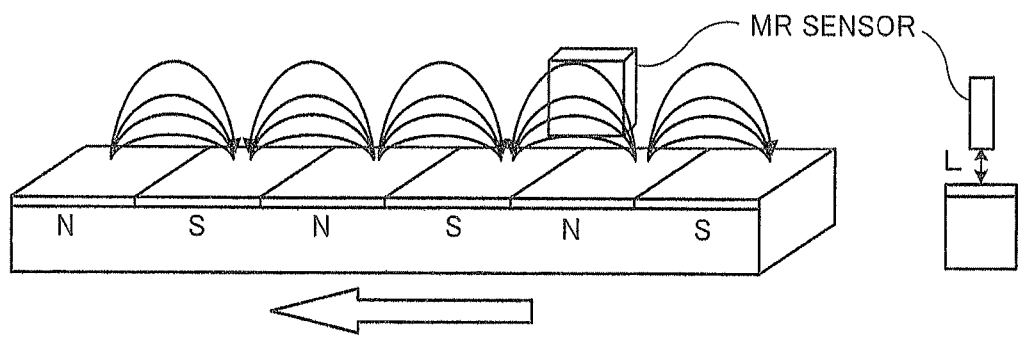
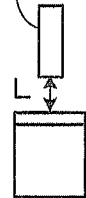
FIG.8C
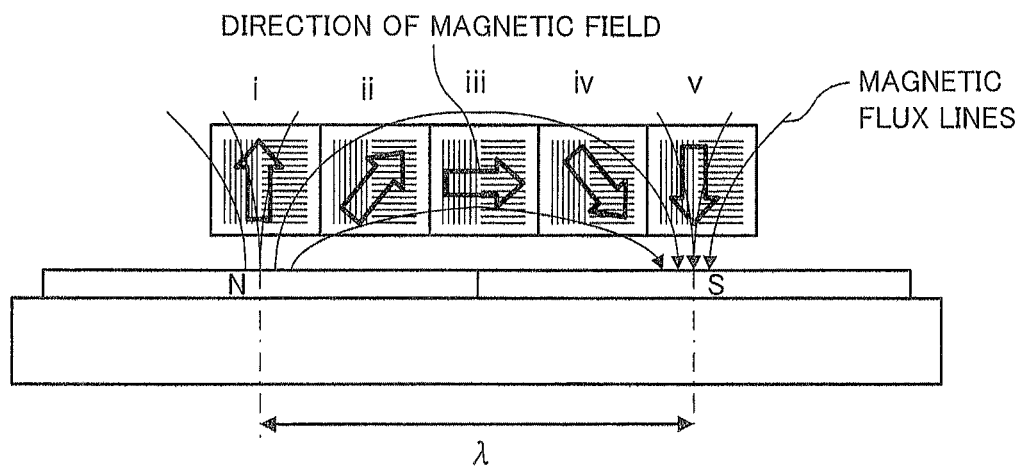
FIG.8D
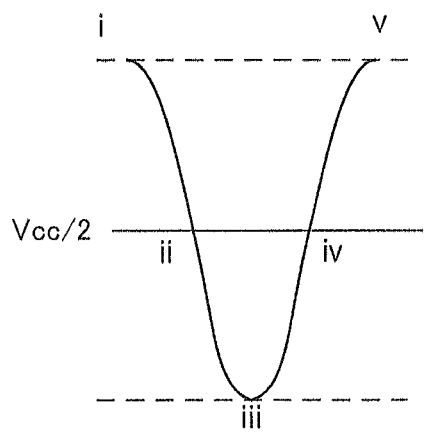

45 DEGREES

ELEMENT CONFIGURATION

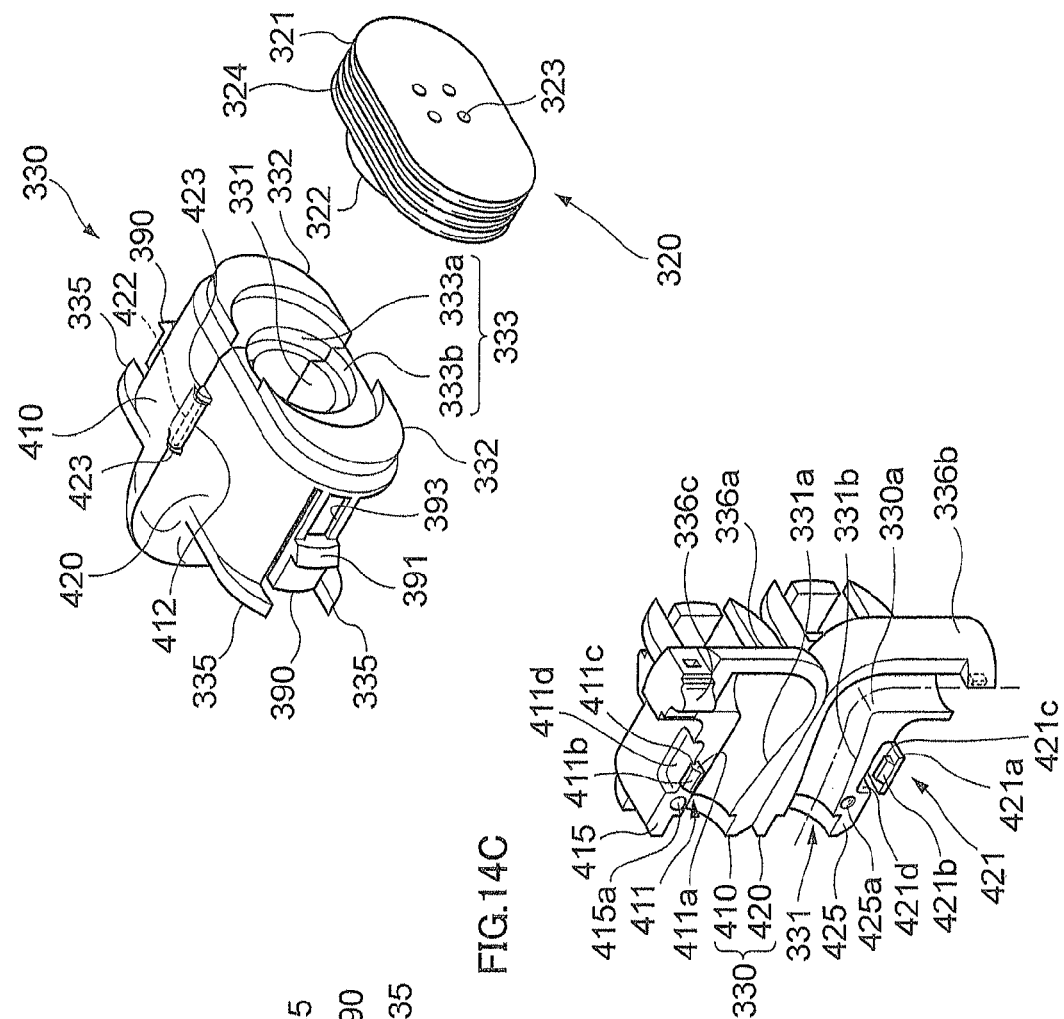
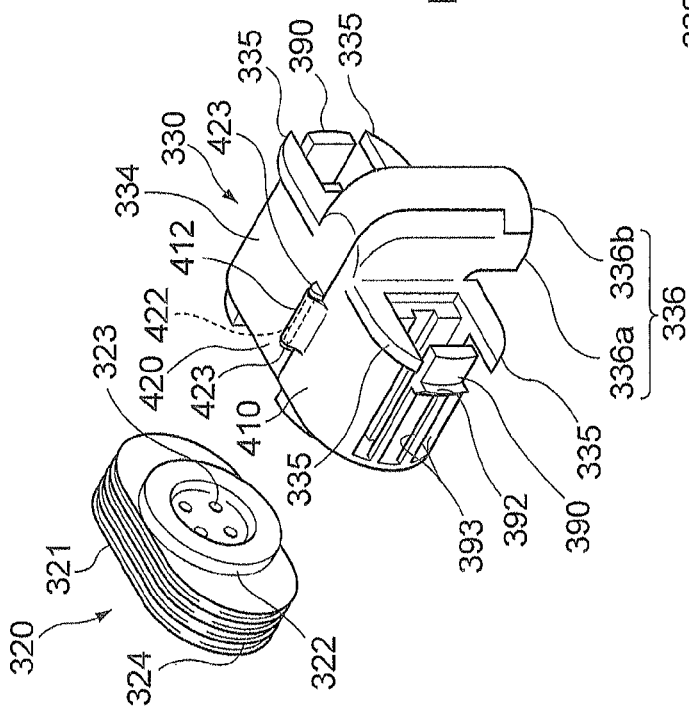
FIG.14A
FIG.14B
FIG.14C

US 8,896,296 B2

RELATIVE ANGLE SENSING DEVICE WITH A HINGED CABLE HARNESS COMPONENT

CROSS REFERENCE TO RELATED APPLICATIONS

This application is based on and claims priority under 35 USC §119 from Japanese Patent Applications No. 2011-262716 filed Nov. 30, 2011, No. 2011-262717 filed Nov. 30, 2011, No. 2012-087448 filed Apr. 6, 2012, and No. 2012-087449 filed Apr. 6, 2012.

BACKGROUND

1. Technical Field

The present invention relates to a relative angle sensing device and an electric power steering apparatus.

2. Related Art

Recently, there has been suggested a device for sensing a relative rotation angle between two rotary shafts coaxially arranged.

For example, a device described in Japanese Patent Application Laid Open Publication No. 2007-187589 is provided with: two magnetism collecting rings that are arranged around the outer periphery of a magnetic circuit formation component contained in a first rotating body and a second rotating body coaxially connected by a torsion bar so as to be isolated in an axial line direction, and collect a magnetic flux generated by the magnetic circuit formation component; a sensing part that senses torque applied to the first rotating body on the basis of the magnetic flux density collected by each of the magnetism collecting rings; a holding ring that holds the magnetism collecting rings and the sensing part, and has an attachment part attached to a housing, at the outer peripheral portion thereof; and a conductive wire that is connected to the sensing part. The sensing part is configured to change a sensed signal in accordance with change of the magnetic flux density generated between convex pieces of the magnetism collecting rings, and the sensed signal is given to a control part formed by using a microprocessor, through the conductive wire.

SUMMARY

In the case where a sensor (sensing part) contained in a housing and a device given a sensing signal from the sensor and arranged at the outside of the housing are connected by an electric cable (conductive wire) held by an electric cable holding member (grommet) inserted into a penetration hole of the housing, there is a possibility that strong force may be applied to an end of the electric cable in the housing even if any force acts on the electric cable at the outside of the housing. For example, in the case where the end of the electric cable is connected to a connecter and the connector is inserted into a connecting terminal, if strong force is applied to the end of the electric cable in the housing, there is a possibility that the electric cable may come off the connector or the connecting terminal to which the connector has been inserted may be broken. In addition, there is a possibility that a sealing property of the electric cable in the electric cable holding member (grommet) may be deteriorated due to application of force on the electric cable at the outside of the housing. Moreover, there is a possibility that the electric cable holding member (grommet) may come off the communication hole due to the application of force on the electric cable at the outside of the housing.

To avoid this, for example, it is considered that, by arranging a plate composed of a sheet metal at the outside of the housing, the electric cable holding member (grommet) inserted into the penetration hole formed in the housing may be prevented from coming off and the electric cable may be supported. However, in this configuration, in the case where the housing is composed of aluminum, there is a possibility that the electric cable holding member (grommet) may be dropped due to occurrence of electrochemical corrosion between the plate and the housing. In addition, man-hour for assembly is increased by arranging the plate at the outside of the housing.

Further, for example, it is considered that a component for preventing the electric cable holding member from coming off the communication hole is arranged at the outside of the electric cable holding member (grommet) in the communication hole of the housing, and the electric cable is pressed by the component in order to prevent the force acting on the electric cable at the outside of the housing from being transferred to the end of the electric cable in the housing if the force acts on the electric cable at the outside of the housing. In this case, it is important that the press of the electric cable by the component has no influence with the holding state of the electric cable by the electric cable holding member or the sealing state of the communication hole of the housing by the electric cable holding member.

An object of the present invention is to suggest an apparatus for achieving a simple configuration in which strong force is not applied to an electric cable holding part of an electric cable holding member and an end of an electric cable in a housing even if any force acts on the electric cable at the outside of the housing.

Another object of the present invention is to suggest an apparatus that prevents force acting on the electric cable at the outside of the housing from being applied to the electric cable holding part of the electric cable holding member while a sealing property of a communication hole of the housing is kept by the electric cable holding member.

In order to attain the above object, the present invention provides a relative angle sensing device including: a sensor that is contained in a housing in which a communication hole communicating inside and outside is formed, and outputs an electric signal according to a relative rotation angle between two rotary shafts coaxially arranged; an electric cable that transmits the electric signal outputted from the sensor to an apparatus arranged at outside of the housing; an electric cable holding member that is fitted with the communication hole of the housing and holds the electric cable; and an outer component that is arranged at a position outside the electric cable holding member in the communication hole of the housing, and that has, at inside thereof, a penetration hole through which the electric cable passes. The outer component has a pair of opening and closing components that is joined by a hinge and opens and closes the penetration hole by relative rotation.

Here, the penetration hole of the outer component is formed so that a hole direction of one end as an end on an electric cable holding member side and a hole direction of the other end as an end on a side opposite to the electric cable holding member side intersect with each other.

The outer component bends the electric cable passing through the penetration hole at a sharp angle between the one end of the penetration hole and the other end thereof.

Further, the outer component has a joining part that is joined by the hinge and projects from an outer peripheral surface to outside, and the housing has a concave part into which the joining part of the outer component is inserted, at a periphery of the communication hole.

The opening and closing components of the outer component have a pair of connecting components joined by a hinge, respectively, each of bodies of the opening and closing components and corresponding one of the connecting components are joined by a hinge, and the pair of the connecting components are contained in an area inside the outer peripheral surface of the outer component when the penetration hole is closed by the pair of the opening and closing components.

From another standpoint, the present invention provides an electric power steering apparatus including: a sensor that outputs an electric signal according to a relative rotation angle between two rotary shafts coaxially arranged; a housing in which the sensor is contained and a communication hole communicating inside and outside is formed; an electric cable that transmits the electric signal outputted from the sensor to an apparatus arranged at outside of the housing; an electric cable holding member that is fitted with the communication hole of the housing and holds the electric cable; and an outer component that is arranged at a position outside the electric cable holding member in the communication hole of the housing, and that has, at inside thereof, a penetration hole through which the electric cable passes. The outer component has a pair of opening and closing components that is joined by a hinge and opens and closes the penetration hole by relative rotation.

In order to attain the above object, the present invention provides a relative angle sensing device including: a sensor that is contained in a housing in which a communication hole communicating inside and outside is formed, and outputs an electric signal according to a relative rotation angle between two rotary shafts coaxially arranged; an electric cable that transmits the electric signal outputted from the sensor to an apparatus arranged at outside of the housing; an electric cable holding member that is fitted with the communication hole of the housing and holds the electric cable; and an outer component that is partially inserted into a position outside the electric cable holding member in the communication hole of the housing, and that has, at inside thereof, a penetration hole through which the electric cable passes. The outer component has a pair of joining components that is joined to form the penetration hole and the pair of the joining components has a pressing part that presses the electric cable at outside of the communication hole of the housing.

Here, the pressing part of the outer component is configured by making the size of the penetration hole partially decreased.

Any one of the joining components of the outer component has a protruding part that protrudes from a wall surface forming the penetration hole to a center of the penetration hole.

Further, a plurality of the electric cables are provided, a tip end of the protruding part provided to one component out of the pair of the joining components of the outer component is formed into a circular arc, the wall surface forming the penetration hole in the other component out of the pair of the joining components is formed into a circular arc, and the pressing part presses the plurality of electric cables so that the plurality of electric cables are aligned in a circumferential direction by the protruding part of the one component and the wall surface of the other component.

A plurality of the electric cables are provided, and a size of the penetration hole is larger than a total size of the plurality of electric cables at an area between an end of the penetration hole of the outer component on an electric cable holding member side and the pressing part.

A bundling component that bundles the plurality of electric cables is provided, and the size of the penetration hole is larger than an outer shape of the bundling component bundling the plurality of electric cables at the area between the end of the penetration hole of the outer component on the electric cable holding member side and the pressing part.

From another standpoint, the present invention provides an electric power steering apparatus including: a sensor that outputs an electric signal according to a relative rotation angle between two rotary shafts coaxially arranged; a housing in which the sensor is contained and a communication hole communicating inside and outside is formed; an electric cable that transmits the electric signal outputted from the sensor to an apparatus arranged at outside of the housing; an electric cable holding member that is fitted with the communication hole of the housing and holds the electric cable; and an outer component that is partially inserted into a position outside the electric cable holding member in the communication hole of the housing, and that has, at inside thereof, a penetration hole through which the electric cable passes. The outer component has a pair of joining components that is joined to form the penetration hole and the pair of the joining components has a pressing part that presses the electric cable at outside of the communication hole of the housing.

According to the present invention, it is possible to achieve a simple configuration in which strong force is not applied to an electric cable holding part of an electric cable holding member and an end of an electric cable in a housing even if any force acts on the electric cable at the outside of the housing.

According to the present invention, it is possible to prevent force acting on the electric cable at the outside of the housing from being applied to the electric cable holding part of the electric cable holding member while a sealing property of a communication hole of the housing is kept by the electric cable holding member.

BRIEF DESCRIPTION OF THE DRAWINGS

Exemplary embodiment(s) of the present invention will be described in detail based on the following figures, wherein:

FIGS. 8A to 8D are views for illustrating a relationship between the change of the direction of the magnetic field and the output of the MR sensor when the magnet moves in a straight line;

FIGS. 14A to 14C are schematic configuration views of the grommet and the socket;

DETAILED DESCRIPTION

Hereinafter, an exemplary embodiment of the present invention will be described in detail with reference to the attached drawings.

Figure 1A:
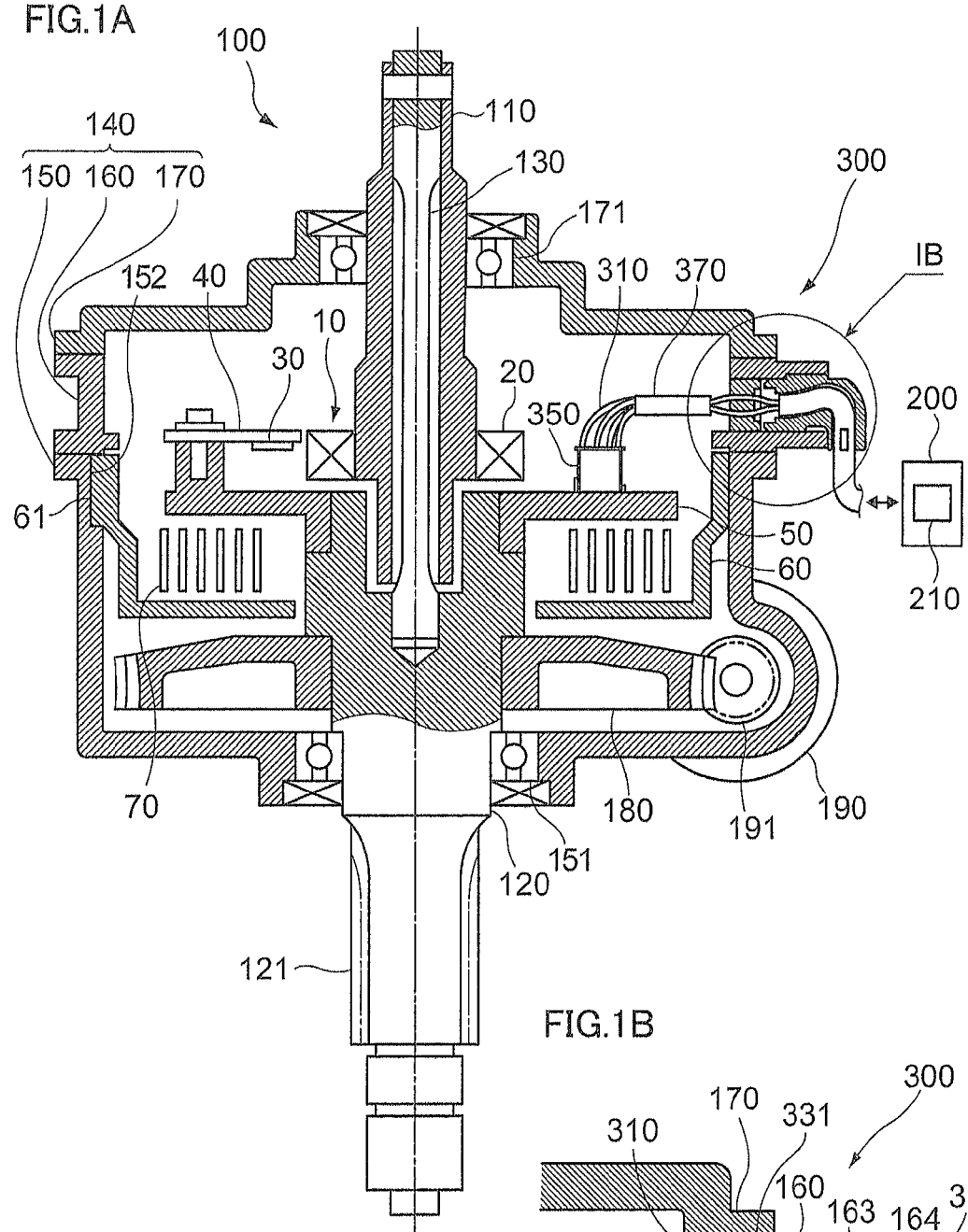
FIGS. 1A and 1B are cross-sectional views of an electric power steering apparatus to which a sensing device according to the exemplary embodiment is applied.
Figure 1B:
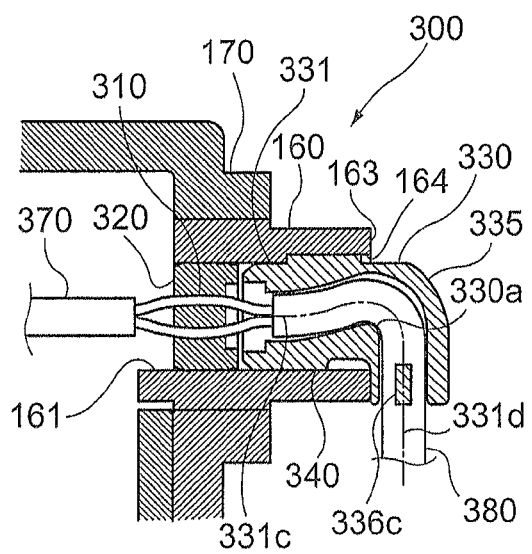
Figure 2:
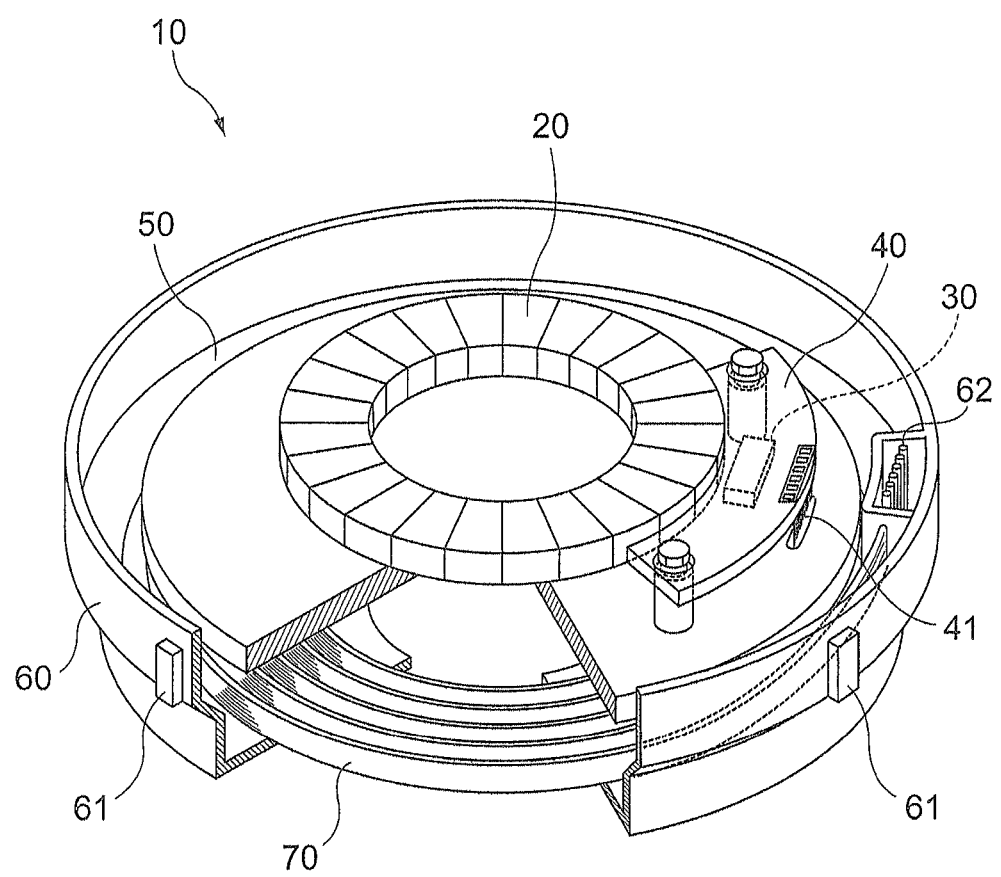
FIG. 2 is a perspective view of the sensing device according to the exemplary embodiment.

FIGS. 1A and 1B are cross-sectional views of an electric power steering apparatus 100 to which a sensing device 10 according to the exemplary embodiment is applied. FIG. 2 is a perspective view of the sensing device 10 according to the exemplary embodiment. Note that, in order to easily understand the configuration, a part of a base 50 and a flat cable cover 60 that will be described later is omitted in FIG. 2.

The electric power steering apparatus 100 is provided with a first rotary shaft 110 and a second rotary shaft 120 that coaxially rotate. The first rotary shaft 110 is a rotary shaft to which, for example, a steering wheel is connected, and the second rotary shaft 120 is coaxially joined to the first rotary shaft 110 through a torsion bar 130. A pinion 121 formed on the second rotary shaft 120 is engaged with a rack (not shown) of a rack shaft (not shown) which is connected to wheels, and rotary movement of the second rotary shaft 120 is converted into linear movement of the rack shaft through the pinion 121 and the rack, and thereby the wheels are steered.

The electric power steering apparatus 100 is provided with a housing 140 that rotatably supports the first rotary shaft 110 and the second rotary shaft 120. The housing 140 is a component fixed to a body frame (hereinafter, referred to as a "vehicle" in some cases) of a vehicle such as an automobile, and is formed of a first housing 150, a second housing 160 and a third housing 170.

The first housing 150 is a component having a shaft bearing 151 that rotatably supports the second rotary shaft 120, on one end side of the second rotary shaft 120 (lower side in FIG. 1A) in a rotary shaft direction (hereinafter, simply referred to as a "shaft direction" in some cases), and an opening on the other end side (upper side in FIG. 1A) in the shaft direction.

The second housing 160 is a component having openings on both end sides in the shaft direction, and is arranged so that one opening on one end side in the shaft direction faces the opening of the first housing 150 on the other end side in the shaft direction. The second housing 160 is fixed to the first housing 150 with, for example, a bolt or the like. On the side surface of the second housing 160, a communication hole 161 for communicating the inside and the outside thereof is formed. The communication hole 161 includes an inner communication hole 161a (refer to FIG. 16B) with which a later-described grommet 320 of a harness component 300 is fitted and that is approximately formed into an elliptic cylinder, and an outer communication hole 161b (refer to FIG. 16B) with which a socket 330 of the harness component 300 is fitted and that is approximately formed into an elliptic cylinder. The outer communication hole 161b has the short side of the ellipse having the same length as that of the inner communication hole 161a, and a longer long side thereof than that of the inner communication hole 161a. The second housing 160 has concave parts 162 (refer to FIGS. 16A and 16B) that are located in the middle of the communication hole 161 in the cylindrical direction of the elliptic cylinder (communication-hole direction), that are concave from a surface forming the outer communication hole 161b of the communication hole 161, and that are formed on both sides in the long side direction of the ellipse. Each of the concave parts 162 is a semi-circular column, and has two vertical surfaces 162a vertical to the cylindrical direction. At the upper portion of the communication hole 161 in the short side direction of the elliptic cylinder (shaft direction) in the second housing 160, a concave part 164 (refer to FIGS. 1B and 16A) that is concave from a surface forming the outer communication hole 161b of the communication hole 161 is formed.

The third housing 170 is a component having a shaft bearing 171 that rotatably supports the first rotary shaft 110 on the other end side in the shaft direction (upper side in FIG. 1A), and an opening on one end side in the shaft direction (lower side in FIG. 1A). The third housing 170 is arranged so that the opening on one end side in the shaft direction faces the opening of the second housing 160 on the other end side in the shaft direction, and is fixed to the second housing 160 with, for example, a bolt or the like.

The electric power steering apparatus 100 is provided with: a worm wheel 180 that is fixed to the second rotary shaft 120 by, for example, press fitting; and an electric motor 190 that has a worm gear 191 engaged with the worm wheel 180 and connected to the output shaft, and that is fixed to the first housing 150.

The electric power steering apparatus 100 is provided with: the sensing device 10 that outputs an electric signal according to the relative rotation angle between the first rotary shaft 110 and the second rotary shaft 120; and an electronic control unit (ECU) 200 that controls driving of the electric motor 190 on the basis of the output value of the sensing device 10.

The ECU 200 includes a relative angle calculator 210 that calculates the relative rotation angle between the first rotary shaft 110 and the second rotary shaft 120 on the basis of the output value from the sensing device 10 by using a CPU that executes various kinds of arithmetic processing, a ROM in which programs executed by the CPU, various kinds of data and the like are stored, and a RAM used as a working memory for the CPU and the like.

Detailed description of the sensing device 10 will be given later.

In the electric power steering apparatus 100 having the aforementioned configuration, since steering torque applied to the steering wheel appears as the relative rotation angle between the first rotary shaft 110 and the second rotary shaft 120, the steering torque is recognized on the basis of the relative rotation angle between the first rotary shaft 110 and the second rotary shaft 120. That is, the relative rotation angle between the first rotary shaft 110 and the second rotary shaft 120 is sensed by the sensing device 10, the ECU 200 recognizes the steering torque on the basis of the output value from the sensing device 10, and driving of the electric motor 190 is controlled on the basis of the recognized steering torque. Then, the generated torque of the electric motor 190 is transmitted to the second rotary shaft 120 through the worm gear 191 and the worm wheel 180. Thereby, the generated torque of the electric motor 190 assists steering force of a driver applied to the steering wheel.

Hereinafter, detailed description will be given for the sensing device 10.

The sensing device 10 is provided with: a magnet 20 that is attached to the first rotary shaft 110; a relative angle sensor 30 that outputs an electric signal according to the relative rotation angle between the first rotary shaft 110 and the second rotary shaft 120 on the basis of the magnetic field of the magnet 20 (magnetic field generated by the magnet 20); and a printed substrate 40 on which the relative angle sensor 30 is mounted. Further, the sensing device 10 is provided with: the base 50 that is attached to the second rotary shaft 120 and that supports the printed substrate 40; and the flat cable cover 60 in which a later-described flat cable 70 is contained, and that is formed into a cylinder with a bottom. Furthermore, the sensing device 10 is provided with: the flat cable 70 that has one end connected to a terminal arranged on the printed substrate 40, and the other end connected to a terminal fixed to the flat cable cover 60; and the harness component 300 that connects the ECU 200 and the terminal fixed to the flat cable cover 60.

The magnet 20 is formed into a cylinder (doughnut shape), the first rotary shaft 110 is fitted with the inner side thereof, and the magnet 20 rotates together with the first rotary shaft 110. North poles and south poles are alternately arranged in the circumferential direction of the first rotary shaft 110, and the magnet 20 is magnetized in the circumferential direction.

The relative angle sensor 30 is arranged outside the outer circumferential surface of the magnet 20 in a rotational radial direction of the first rotary shaft 110, and within a region in which the magnet 20 is provided in the shaft direction of the first rotary shaft 110. The relative angle sensor 30 according to the exemplary embodiment is a MR sensor (magnetoresistive element) that is a magnetic sensor using change in resistance by a magnetic field. The relative angle sensor 30 outputs the electric signal according to the relative rotation angle between the first rotary shaft 110 and the second rotary shaft 120 on the basis of the magnetic field of the magnet 20 (magnetic field generated by the magnet 20), and thereby the relative rotation angle between the two rotary shafts that are coaxially arranged is sensed. Detailed description will be given later for the relative angle sensor 30 and the sensing method of the relative rotation angle.

The printed substrate 40 is fixed to the base 50 with, for example, a bolt or the like so as to be arranged outside the outer circumferential surface of the magnet 20 in the rotational radial direction of the first rotary shaft 110.

The base 50 is a disc-shaped component, is fitted with the second rotary shaft 120, and rotates together with the second rotary shaft 120.

The flat cable cover 60 is a cylindrical component with a bottom, and is fixed to the housing 140. The following configuration is exemplified as a configuration in which the flat cable cover 60 is fixed to the housing 140. That is, plural convex parts 61 that are arranged on the outer circumferential surface of the flat cable cover 60 at regular intervals in the circumferential direction (4 convex parts arranged at intervals of 90 degrees in the exemplary embodiment) are formed so as to extend outside. On the other hand, on the first housing 150 of the housing 140, concave parts 151 the number of which is the same as the number of the convex parts 61 are formed, with which the convex parts 61 are fitted. By fitting the convex parts 61 of the flat cable cover 60 with the concave parts 151 formed on the first housing 150, the second rotary shaft 120 is positioned in the rotational direction. Further, by pressing the upper surface of the flat cable cover 60 with the second housing 160, positioning is conducted in the shaft direction. Alternatively, the flat cable cover 60 may be fixed to the first housing 150 or the second housing 160 with, for example, a bolt or the like.

One end of the flat cable 70 is connected to a terminal 41 of the printed substrate 40, the other end of the flat cable 70 is connected to a connecting terminal 62 arranged inside the flat cable cover 60, and the flat cable 70 is contained in a space formed by the inside of the flat cable cover 60 and one end surface of the base 50 in the shaft direction in a spirally wound state. The flat cable 70 is wound in a right-handed direction as shown in FIG. 2 when it is seen from the other end side in the shaft direction, and in a case where the steering wheel, that is, the first rotary shaft 110 and the second rotary shaft 120 are rotated in the right-handed direction, one end rotates in the right-handed direction according to the rotation of the second rotary shaft 120, and thus the number of windings increases in comparison with a neutral state in which the steering wheel is not rotated. On the other hand, in a case where the steering wheel is rotated in a left-handed direction, the number of windings decreases in comparison with the neutral state in which the steering wheel is not rotated.

The harness component 300 has a function for transmitting the output signal from the relative angle sensor 30 to the ECU 200. Detailed description will be given later for the harness component 300.

Hereinafter, description will be given for the relative angle sensor 30 according to the exemplary embodiment.

The relative angle sensor 30 according to the exemplary embodiment is a MR sensor (magnetoresistive element) using change in resistance according to a magnetic field.

First, an operating principle of the MR sensor will be described.

The MR sensor is formed of Si or a glass substrate, and a thin film that is formed thereon and is made of an alloy mainly containing a ferromagnetic metal such as Ni—Fe, and the resistance of the thin-film ferromagnetic metal changes in accordance with intensity of a magnetic field in a specific direction.

Figure 3:
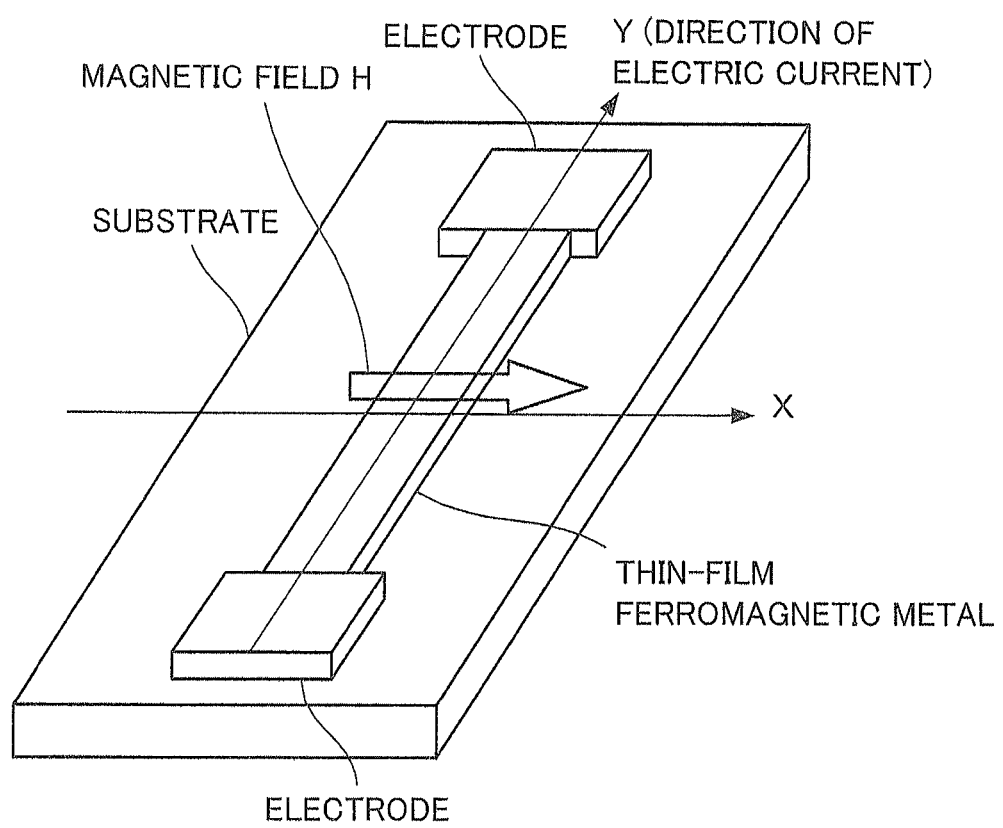
FIG. 3 is a view for illustrating a direction of an electric current applied to the thin-film ferromagnetic metal and a direction of an applied magnetic field.
Figure 4:
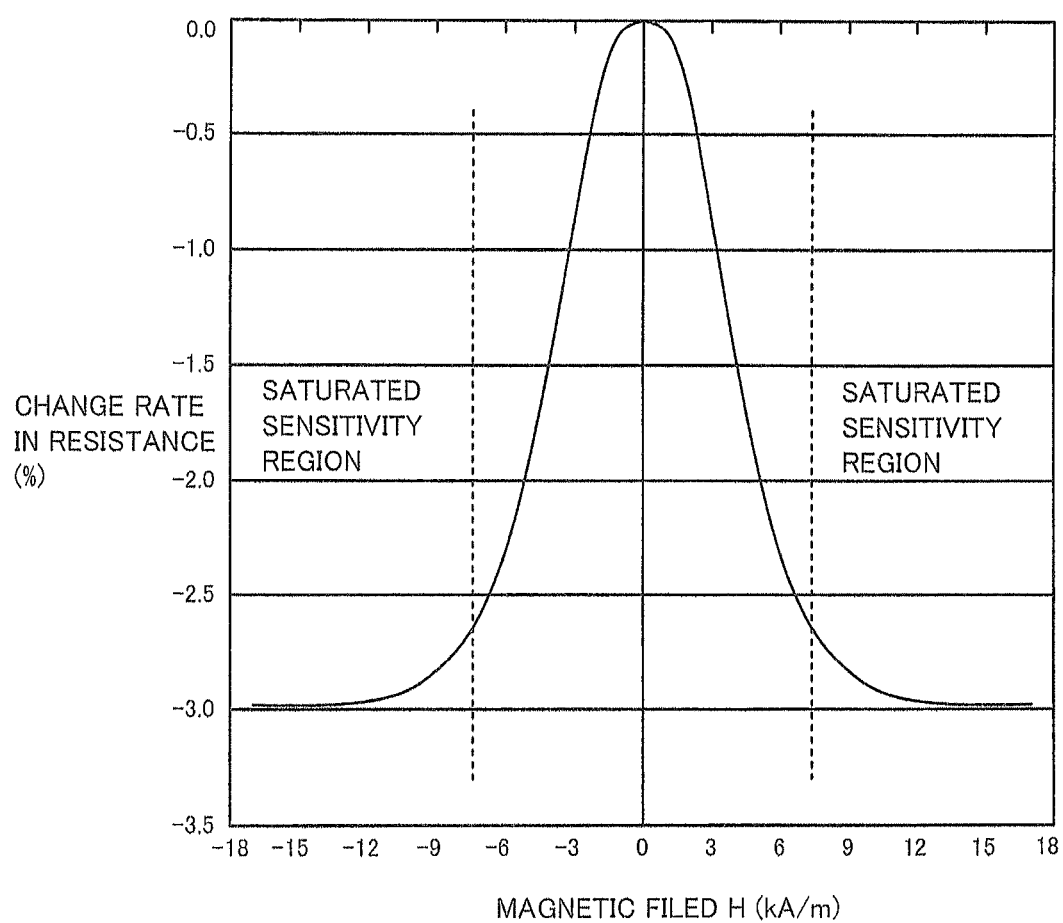
FIG. 4 is a graph for showing a relationship between intensity of the magnetic field and resistance of the thin-film ferromagnetic metal in a case where the intensity of the magnetic field is changed in the state shown in FIG. 3.

FIG. 3 is a view for illustrating a direction of an electric current applied to the thin-film ferromagnetic metal and a direction of an applied magnetic field. FIG. 4 is a graph for showing a relationship between intensity of the magnetic field and resistance of the thin-film ferromagnetic metal in a case where the intensity of the magnetic field is changed in the state shown in FIG. 3.

As shown in FIG. 3, an electric current is applied to the thin-film ferromagnetic metal forming into a rectangle on the substrate in a long side direction of the rectangle, that is, a Y direction in FIG. 3. On the other hand, a magnetic field H is applied thereto in a vertical direction (X direction in FIG. 3) with respect to the direction of the electric current (Y direction), and the intensity of the magnetic field is changed in this condition. It is FIG. 4 that shows how the resistance of the thin-film ferromagnetic metal is changed in such a condition.

As shown in FIG. 4, even if the intensity of the magnetic field is made to be changed, change in the resistance from a point at no magnetic field (point where the intensity of the magnetic field is zero) is up to approximately 3%.

Hereinafter, a region outside a region in which the amount of change in the resistance ($\Delta R$) is approximately represented by a formula, "$\Delta R \propto H^2$" is referred to as a "saturated sensitivity region." In the saturated sensitivity region, change in the resistance of 3% does not vary if the intensity of the magnetic field is not less than certain intensity (hereinafter, referred to as a "specified intensity of the magnetic field").

Figure 5:
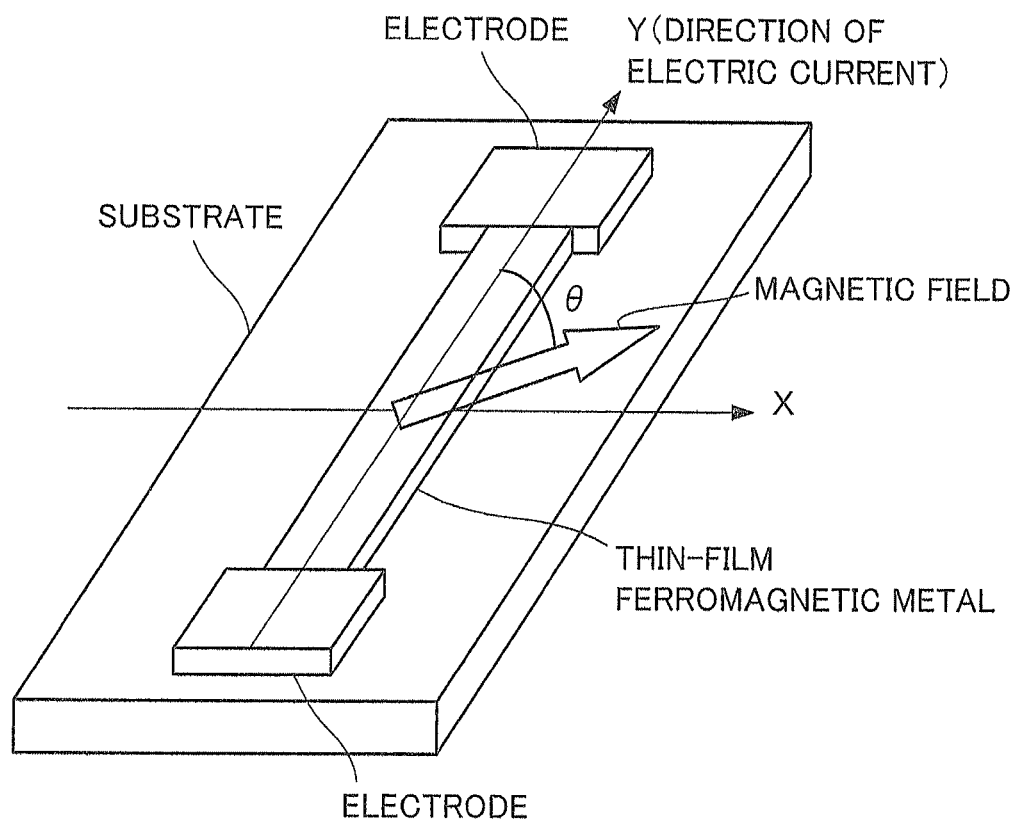
FIG. 5 is a view for illustrating a direction of an electric current applied to the thin-film ferromagnetic metal and a direction of an applied magnetic field.
Figure 6A:
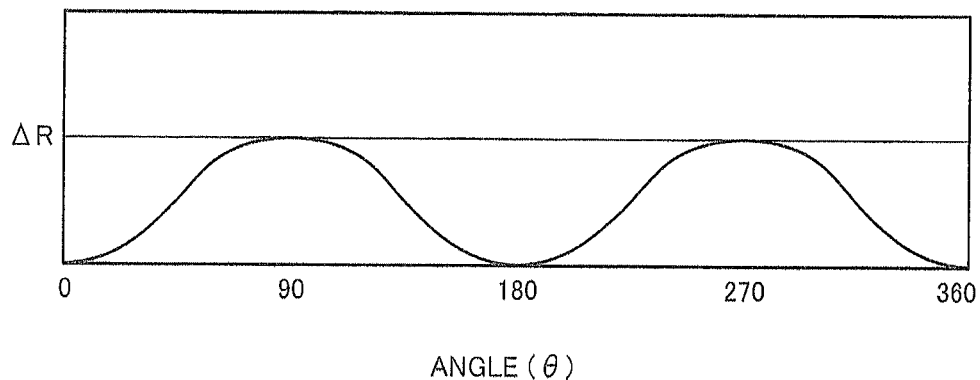
FIGS. 6A and 6B are graphs for showing a relationship between the direction of the magnetic field and the resistance of the thin-film ferromagnetic metal.
Figure 6B:
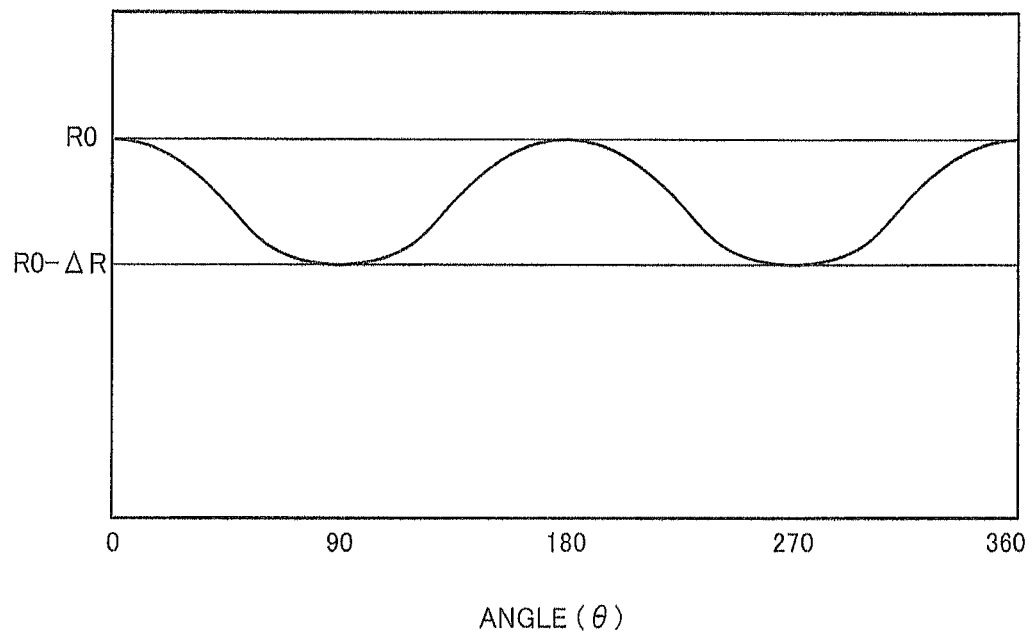

FIG. 5 is a view for illustrating a direction of an electric current applied to the thin-film ferromagnetic metal and a direction of an applied magnetic field. FIGS. 6A and 6B are graphs for showing a relationship between the direction of the magnetic field and the resistance of the thin-film ferromagnetic metal.

As shown in FIG. 5, an electric current is made to flow in a direction of the long side of the rectangle forming the thin-film ferromagnetic metal, that is, a Y direction in FIG. 5, and, as a direction of the magnetic field, change of an angle θ is given with respect to the direction of the electric current. At this time, in order to recognize change in the resistance of the thin-film ferromagnetic metal due to the direction of the magnetic field, the intensity of the magnetic field applied thereto is not less than the aforementioned specified intensity of the magnetic field at which the resistance does not change due to the intensity of the magnetic field.

As shown in FIG. 6A, the amount of change in the resistance is maximum when the direction of the electric current and the direction of the magnetic field are vertical to each other (θ=90 degrees, or 270 degrees), and is minimum when the direction of the electric current and the direction of the magnetic field are parallel to each other (θ=0 degree, or 180 degrees). If the maximum amount of change in the resistance in this case is set as $\Delta R$, the resistance of the thin-film ferromagnetic metal R changes as an angular component between the direction of the electric current and the direction of the magnetic field, is represented by an equation (1), and is shown in FIG. 6B.

$$R = R0 - \Delta R \sin^2\theta \tag{1}$$

Herein, R0 denotes the resistance in a case where the magnetic field not less than the specified intensity of the magnetic field is applied thereto so as to be parallel to the direction of the electric current (θ=0 degree or 180 degrees).

By the equation (1), the direction of the magnetic field not less than the specified intensity of the magnetic field can be sensed by recognizing the resistance of the thin-film ferromagnetic metal.

Next, a sensing principle of the MR sensor will be described.

Figure 7A:
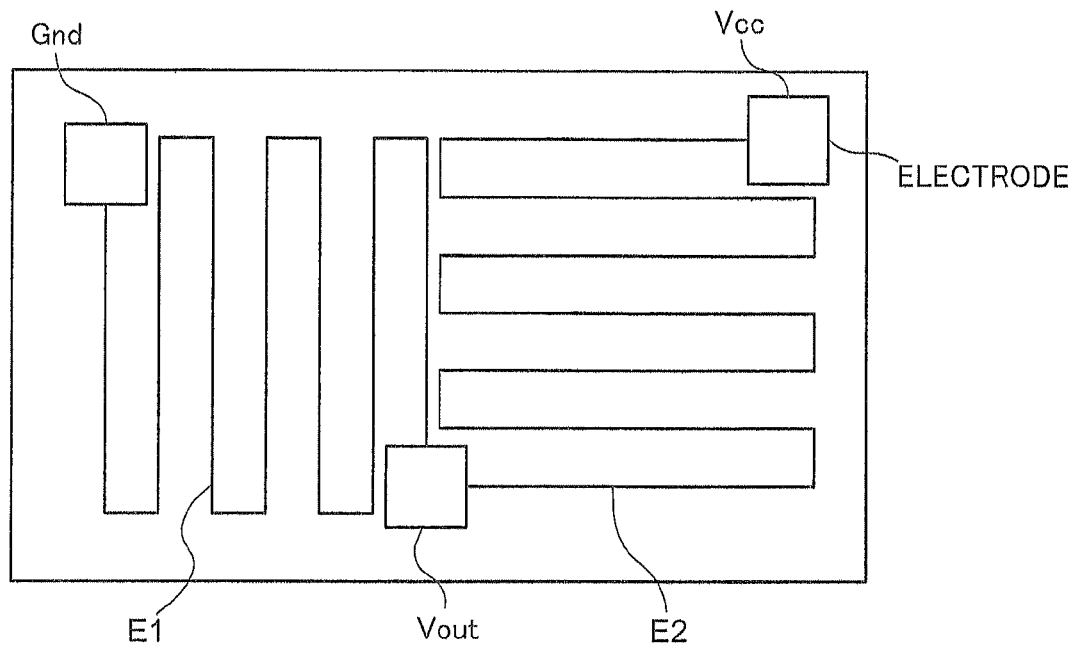
FIG. 7A is a view for illustrating an example of the MR sensor using a principle for sensing a direction of a magnetic field under intensity of a magnetic field not less than the specified intensity of the magnetic field.
Figure 7B:
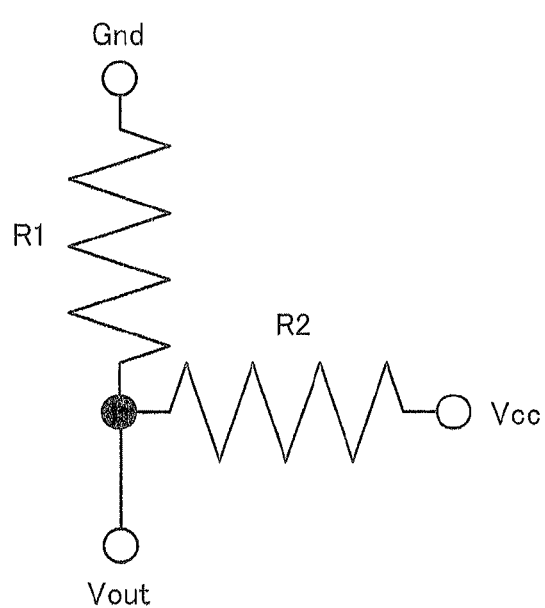
FIG. 7B is a view for illustrating the configuration of the MR sensor shown in FIG. 7A as an equivalent circuit.

FIG. 7A is a view for illustrating an example of the MR sensor using a principle for sensing a direction of a magnetic field under intensity of a magnetic field not less than the specified intensity of the magnetic field. FIG. 7B is a view for illustrating the configuration of the MR sensor shown in FIG. 7A as an equivalent circuit.

In the thin-film ferromagnetic metal of the MR sensor shown in FIG. 7A, a first element E1 that is formed so as to have a longer side in the vertical direction and a second element E2 that is formed so as to have a longer side in the horizontal direction are arranged in series.

In the thin-film ferromagnetic metal having such a shape, the magnetic field in the vertical direction, which leads to the maximum change in the resistance with respect to the first element E1, leads to the minimum change in the resistance with respect to the second element E2. The resistance R1 of the first element E1 is given by an equation (2), and the resistance R2 of the second element E2 is given by an equation (3).

$$R1 = R0 - \Delta R \sin^2\theta \tag{2}$$

$$R2 = R0 - \Delta R \cos^2\theta \tag{3}$$

The equivalent circuit of the MR sensor having the element configuration shown in FIG. 7A is shown in FIG. 7B.

As shown in FIGS. 7A and 7B, in a case where an end of the first element E1, which is not connected to the second element E2, is set as a ground (Gnd), and an end of the second element E2, which is not connected to the first element E1, is set to have an output voltage of Vcc, an output voltage Vout at a connecting part between the first element E1 and the second element E2 is given by an equation (4).

$$V\text{out} = (R1/(R1+R2)) \times Vcc \tag{4}$$

When the equations (2) and (3) are substituted into the equation (4) and the resultant equation is reorganized, an equation (5) is obtained.

$$V\text{out} = Vcc/2 + \alpha \times \cos 2\theta \tag{5}$$

Herein, $\alpha = (\Delta R/(2 \times (2 \times R0 - \Delta R))) \times Vcc$.

By the equation (5), the direction of the magnetic field is recognized by sensing the Vout.

FIGS. 8A to 8D are views for illustrating a relationship between the change of the direction of the magnetic field and the output of the MR sensor when the magnet moves in a straight line.

As shown in FIG. 8A, the MR sensor shown in FIGS. 7A and 7B is arranged with respect to the magnet in which north poles and south poles are alternately arranged so that the intensity of the magnetic field not less than the specified intensity of the magnetic field is applied thereto with a gap L (distance between the magnet and the MR sensor), and change of the direction of the magnetic field affects a sensor surface of the MR sensor.

Then, the magnet is made to move to the left as shown in FIG. 8A, by a distance λ from the center of the north pole to the center of the south pole (hereinafter, referred to as a "magnetized pitch" in some cases), which is shown in FIG. 8C. In this case, the magnetic field whose direction is shown with an arrow in FIG. 8C is applied to the MR sensor in accordance with the position of the magnet, and the direction of the magnetic field is half rotated on the sensor surface when the magnet moves by the magnetized pitch λ. Hence, a waveform of the output voltage Vout at the connecting part between the first element E1 and the second element E2 has one cycle as shown in FIG. 8D because of the equation (5), "Vout=Vcc/2+α×cos 2θ."

Figure 9A:
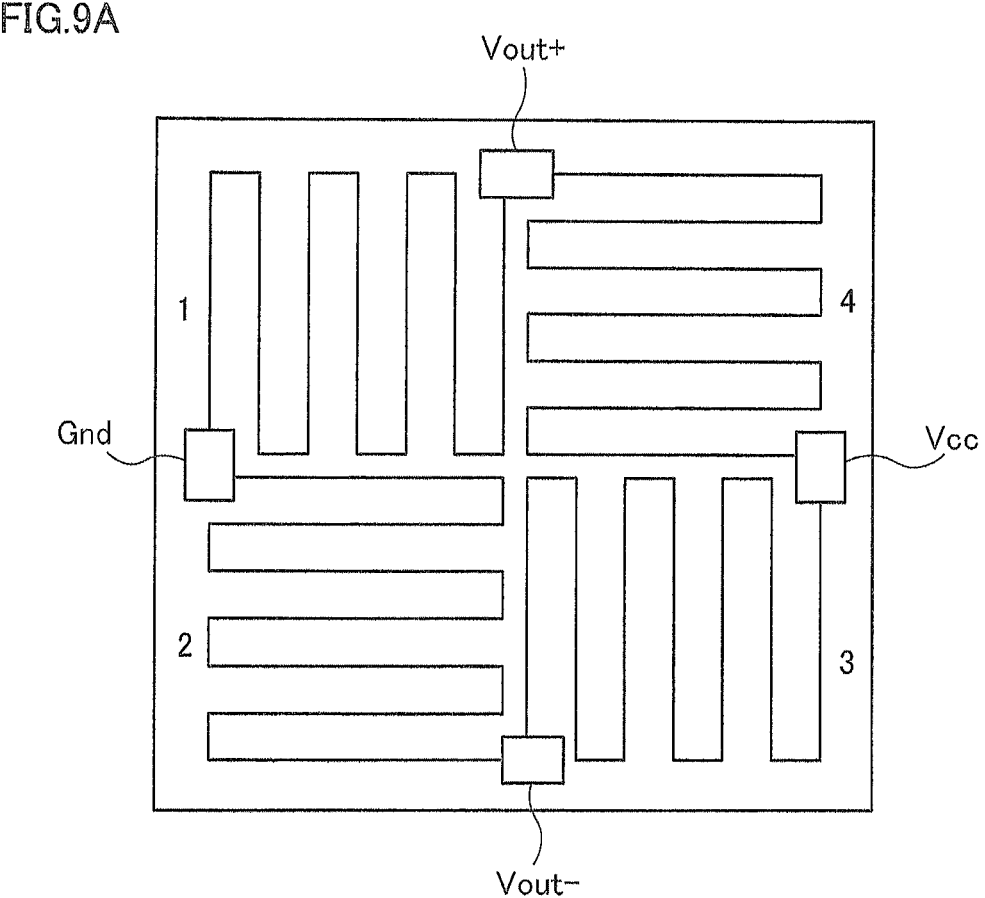
FIGS. 9A and 9B are views for illustrating another example of the MR sensor.
Figure 9B:
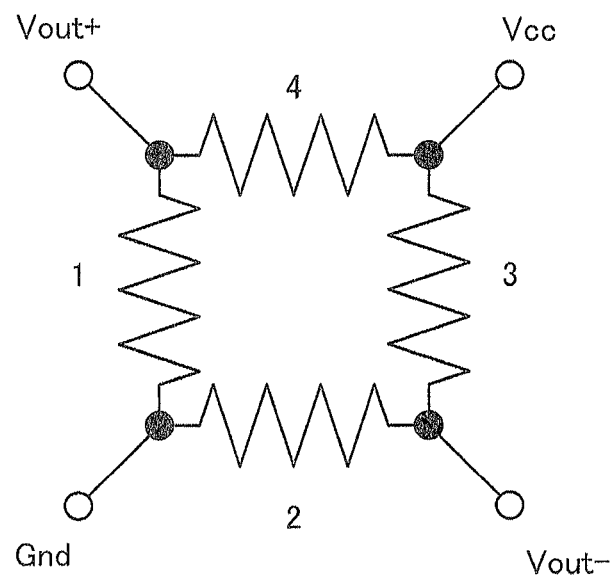

FIGS. 9A and 9B are views for illustrating another example of the MR sensor.

Instead of the element configuration shown in FIGS. 7A and 7B, if an element configuration shown in FIG. 9A is adopted, a well-known configuration having a Wheatston bridge (full bridge) is achieved, as shown in FIG. 9B. Thus, by using the MR sensor having the element configuration shown in FIG. 9A, it is possible to enhance a sensing accuracy.

Description will be given for a method for sensing a moving direction of the magnet.

From the relationship between the direction of the magnetic field and the resistance of the thin-film ferromagnetic metal shown in FIGS. 6A and 6B and the equation (1), "$R=R_0-\Delta R \sin^2\theta$," the resistance of the thin-film ferromagnetic metal is the same in both cases in which the direction of the magnetic field is made to be rotated in a clockwise direction with respect to the direction of the electric current, and in a counterclockwise direction when it is seen in FIG. 5. Accordingly, although the resistance of the thin-film ferromagnetic metal is recognized, the moving direction of the magnet cannot be recognized.

Figure 10:
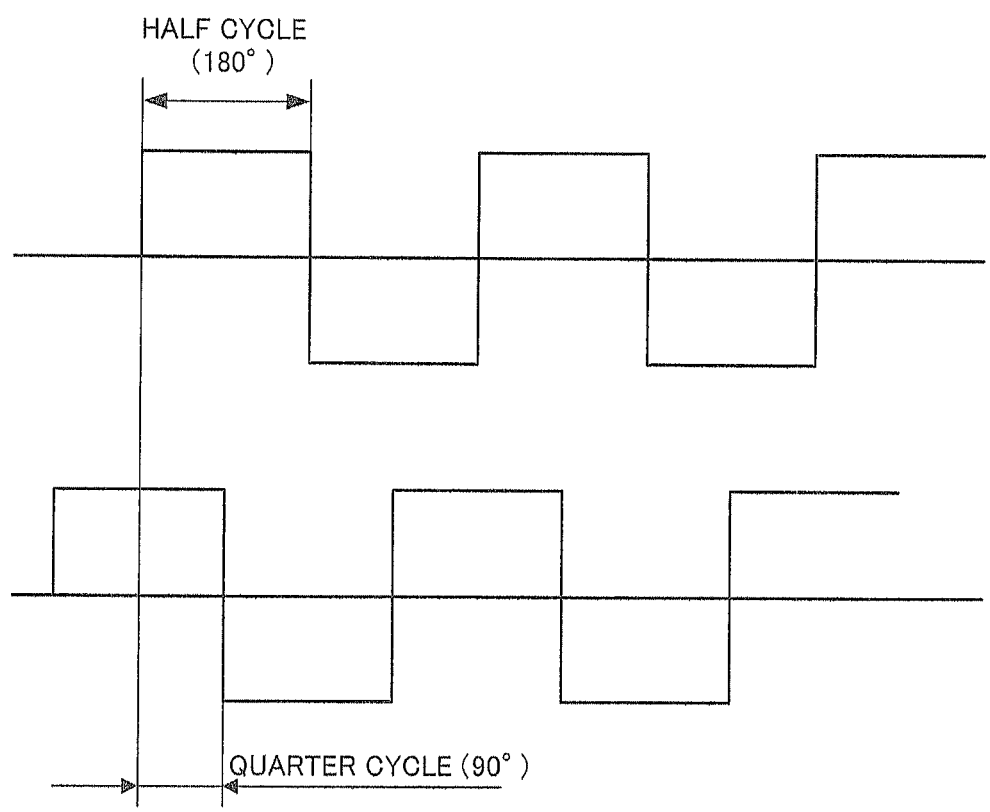
FIG. 10 is a diagram for illustrating one example of a combination of outputs used for sensing a moving direction of the magnet.

FIG. 10 is a diagram for illustrating one example of a combination of outputs used for sensing a moving direction of the magnet. As shown in FIG. 10, by combining two outputs having phase difference of quarter cycles, the moving direction of the magnet can be sensed. In order to obtain these outputs, two MR sensors are arranged so as to have a phase relationship such as (i) and (ii) or (i) and (iv) shown in FIG. 8C.

Figure 11A:
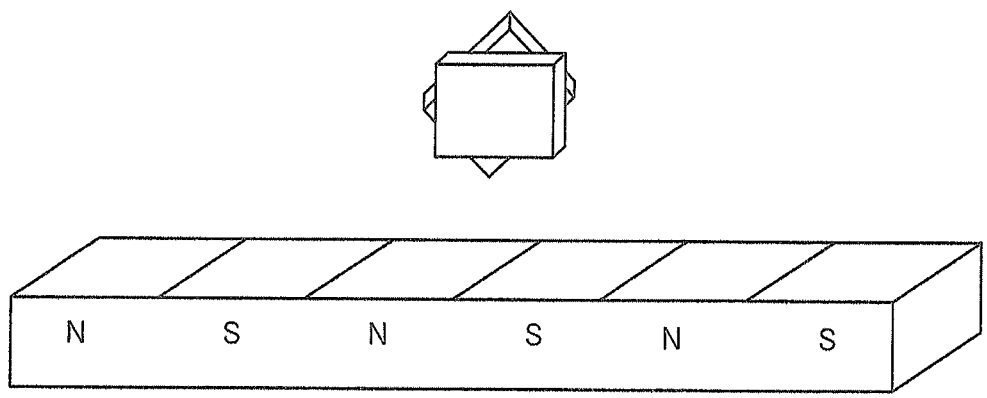
FIGS. 11A and 11B are views for illustrating an example of an arrangement of the MR sensors.
Figure 11B:
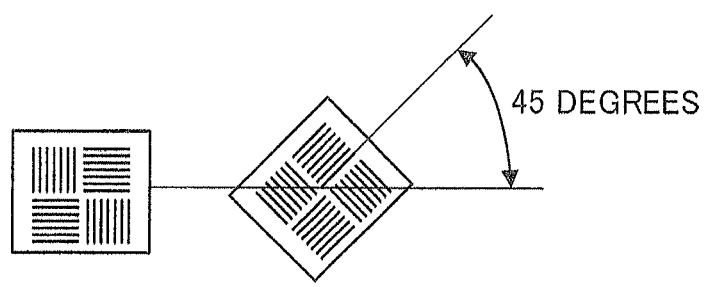

FIGS. 11A and 11B are views for illustrating an example of an arrangement of the MR sensors. As shown in FIGS. 11A and 11B, two MR sensors may be stacked and one MR sensor may be arranged to have an angle of 45 degrees with respect to the other sensor.

Figure 12A:
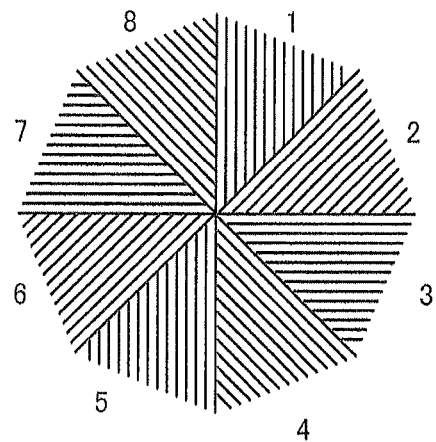
FIGS. 12A to 12C are diagrams for illustrating another example of the MR sensor.
Figure 12B:
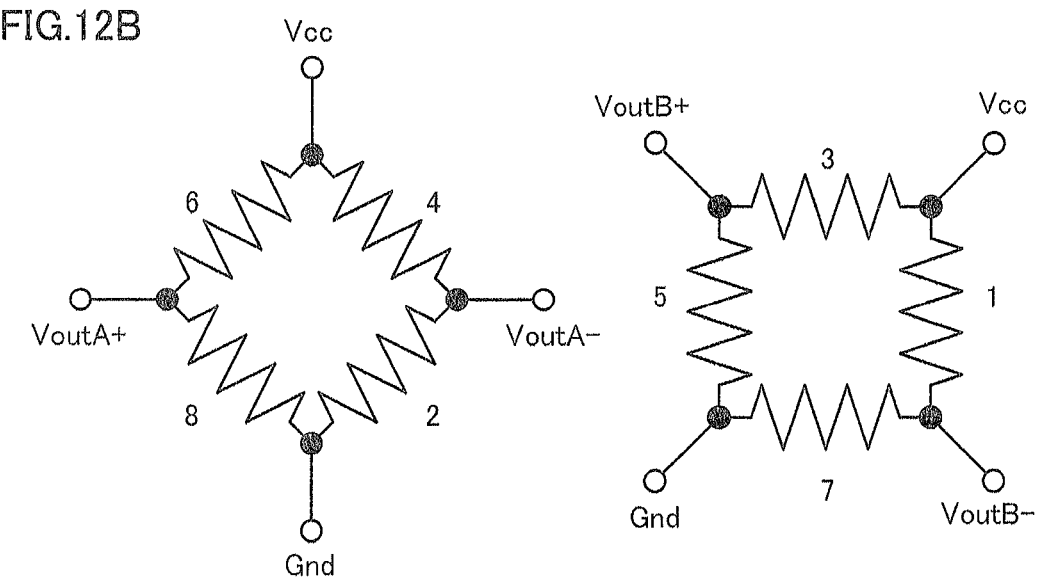
Figure 12C:
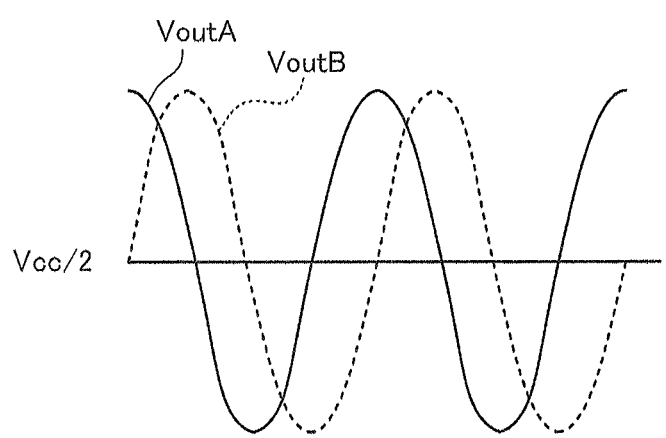

FIGS. 12A to 12C are diagrams for illustrating another example of the MR sensor. As shown in FIG. 12A, two pairs of elements each having a full-bridge configuration are formed on one substrate so as to have an angle of 45 degrees with respect to each other, and the element configuration forming an equivalent circuit shown in FIG. 12B may be considered. By this configuration, as shown in FIG. 12C, it is possible to output accurate sine and cosine waves by one MR sensor. Thus, the moving direction and the amount of the movement of the magnet with respect to the MR sensor can be recognized by the output value of the MR sensor having the element configuration shown in FIGS. 12A to 12C.

In consideration of the aforementioned characteristics of the MR sensor, the MR sensor having the element configuration shown in FIGS. 12A to 12C is used as the relative angle sensor 30 in the sensing device 10 according to the exemplary embodiment. The relative angle sensor 30 is vertically arranged with respect to the outer circumferential surface of the magnet 20, and the position of the second rotary shaft 120 in the shaft direction is within the region of the magnet 20, as described above. Thus, in this case, the relative angle sensor 30 shows change of the direction of the magnetic field shown in FIG. 8C in accordance with the position of the magnet 20 by the magnetic field of the magnet 20 rotating together with the first rotary shaft 110.

As a result, when the magnet 20 moves (rotates) by the magnetized pitch λ, the direction of the magnetic field half rotates on the magnetically sensitive surface of the relative angle sensor 30 and the output values Vout A and Vout B from the relative angle sensor 30 are cosine and sine curves (waves) having phase difference of the quarter cycles as shown in FIG. 12C, respectively.

That is, when a driver rotates the steering wheel, the first rotary shaft 110 also rotates according to this rotation, and the torsion bar 130 twists. Then, the second rotary shaft 120 rotates a little later than the first rotary shaft 110. This delay appears as difference between the rotation angles of the first rotary shaft 110 and the second rotary shaft 120 that are connected to the torsion bar 130. The sensing device 10 outputs Vout A and Vout B that are the cosine and sine curves having phase difference of the quarter cycles according to the difference of the rotation angle.

Note that, the magnetically sensitive surface of the relative angle sensor 30 indicates a surface on which a magnetic field can be sensed in the relative angle sensor 30.

The relative angle calculator 210 of the ECU 200 calculates a relative rotation angle θt between the first rotary shaft 110 and the second rotary shaft 120 by using a following equation (6) on the basis of the output values Vout A and Vout B of the relative angle sensor 30.

$$\theta t = \arctan(VoutB/VoutA) \qquad (6)$$

As described above, it is possible for the relative angle calculator 210 to recognize the relative rotation angle between the first rotary shaft 110 and the second rotary shaft 120 and the twisting direction, that is, the amount and the direction of the torque applied to the steering wheel, on the basis of the output values from the relative angle sensor 30.

When the sensing device 10 having the aforementioned configuration is attached, the flat cable cover 60, the base 50 to which the printed substrate 40 has been attached, and the flat cable 70 contained between the flat cable cover 60 and the base 50 are unitized in advance. This unit is attached to the first housing 150 to which the second rotary shaft 120 has been attached so that the convex parts 61 of the flat cable cover 60 are fitted with the concave parts 151 of the first housing 150. At this time, the base 50 is attached to the second rotary shaft 120.

As described above, it is possible to improve an assembly property by making the sensing device 10 unitizable in advance.

Next, the harness component 300 will be described.

Figure 13:
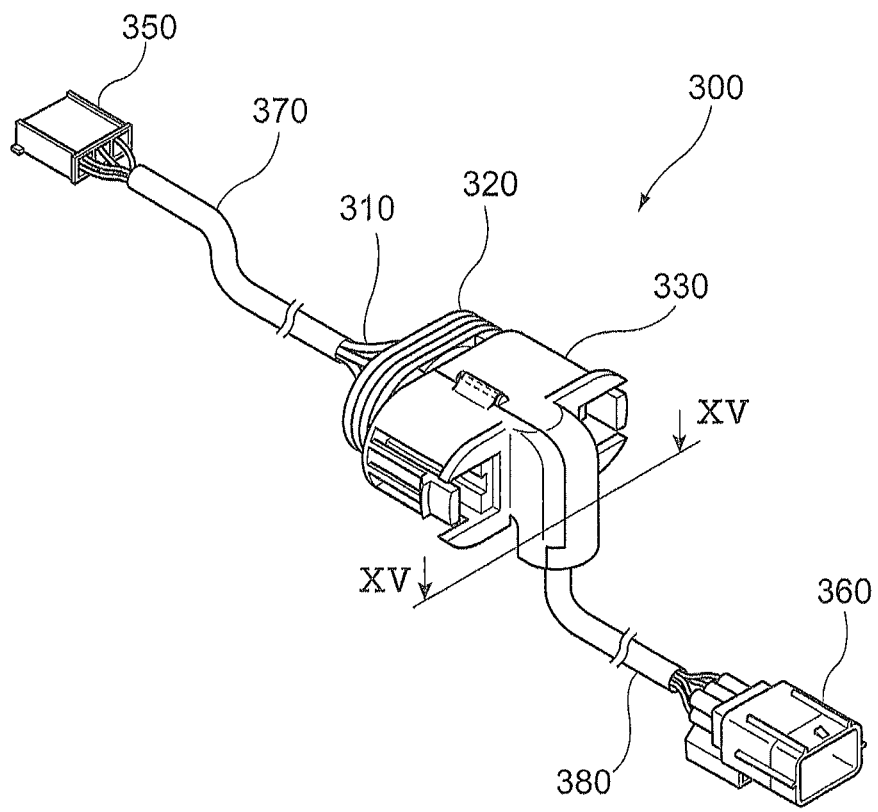
FIG. 13 is an external view of the harness component according to the exemplary embodiment.

FIG. 13 is an external view of the harness component 300 according to the exemplary embodiment.

The harness component 300 is provided with: plural electric cables 310; the grommet 320 as an example of an electric cable holding member that holds the plural electric cables 310; and the socket 330 as an example of an outer component that is arranged at a position outside the grommet 320 and keeps the grommet 320 from moving. Further, the harness component 300 is provided with: a first connector 350 that is connected to one end of the plural electric cables 310; and a second connector 360 that is connected to the other end of the plural electric cables 310. Furthermore, the harness component 300 is provided with: a first cover 370 that bundles the plural electric cables 310 between the grommet 320 and the first connector 350; and a second cover 380 as a bundling component that bundles the plural electric cables 310 between the grommet 320 and the second connector 360.

The harness component 300 according to the exemplary embodiment has four electric cables 310, and one end of these four electric cables 310 is connected to the printed substrate 40 through the first connector 350, the connecting terminal 62 and the like, and the other end of these four electric cables 310 is connected to the ECU 200 through the second connector 360 and the like. The four electric cables 310 are used for electric supply from the ECU 200 to the relative angle sensor 30 and transmission of the output values from the relative angle sensor 30 to the ECU 200.

The electric cables 310 are an electric conductor such as a linearly elongated metal, which has been covered with an insulator, and have an electric conductivity. The harness component 300 according to the exemplary embodiment has four electric cables 310, one end of these four electric cables 310 is connected to the first connector 350, the other end thereof is connected to the second connector 360, and they are bundled by the first cover 370 and the second cover 380 as an insulator.

FIGS. 14A to 14C are schematic configuration views of the grommet 320 and the socket 330. FIG. 14A is a perspective view seen from the second connector 360 side, and FIG. 14B is a perspective view seen from the first connector 350 side. FIG. 14C is a view for illustrating an unjointed state of the socket 330.

Figure 15:
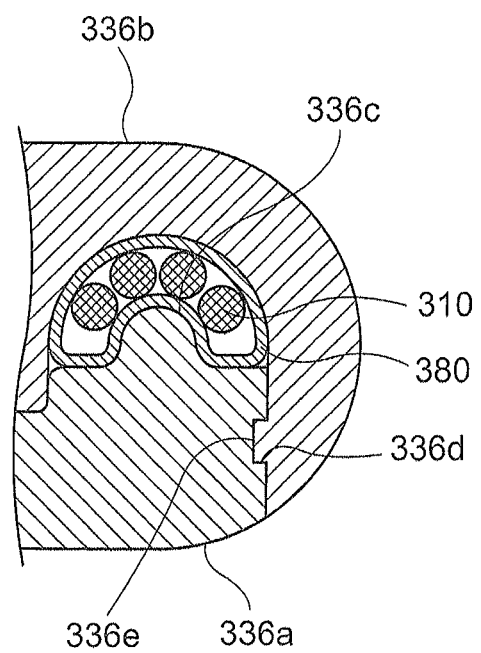
FIG. 15 is a cross-sectional view taken along a line XV-XV in FIG. 13.

FIG. 15 is a cross-sectional view taken along a line XV-XV in FIG. 13.

Figure 16A:
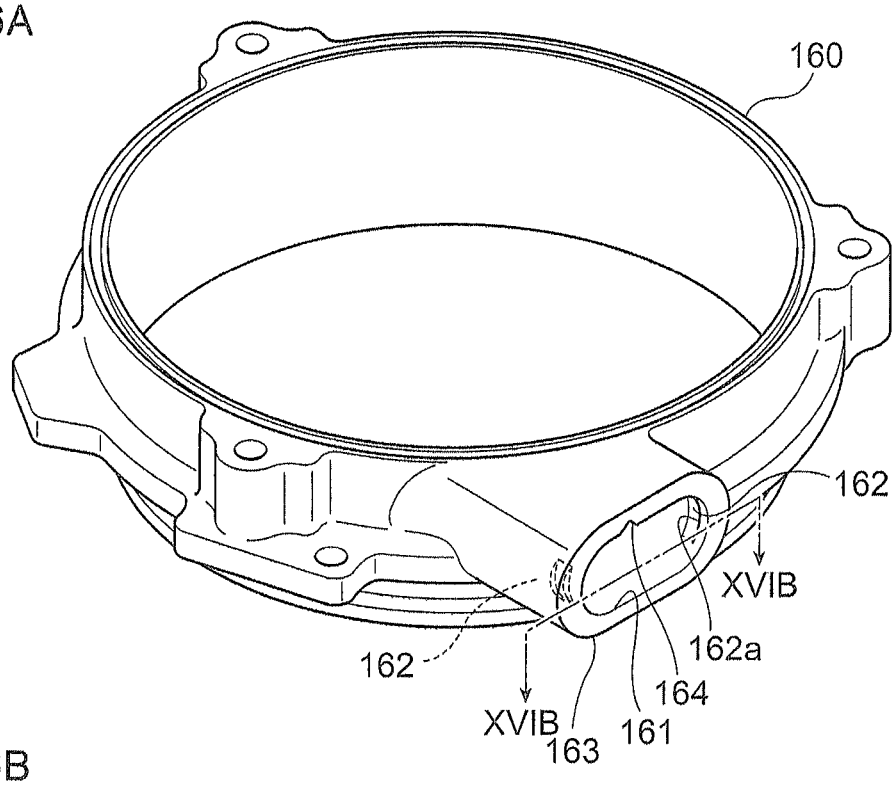
FIG. 16A is a schematic configuration view of the second housing.

FIG. 16A is a schematic configuration view of the second housing 160.

Figure 16B:
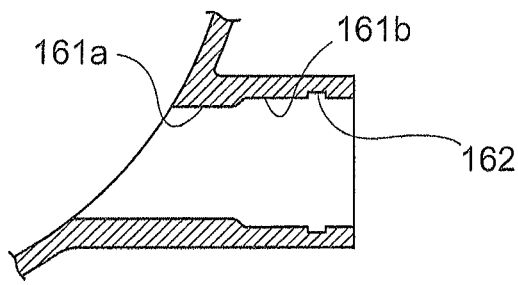
FIG. 16B is a cross-sectional view taken along a line XVIB-XVIB in FIG. 16A.

FIG. 16B is a cross-sectional view taken along a line XVIB-XVIB in FIG. 16A.

Figure 16C:
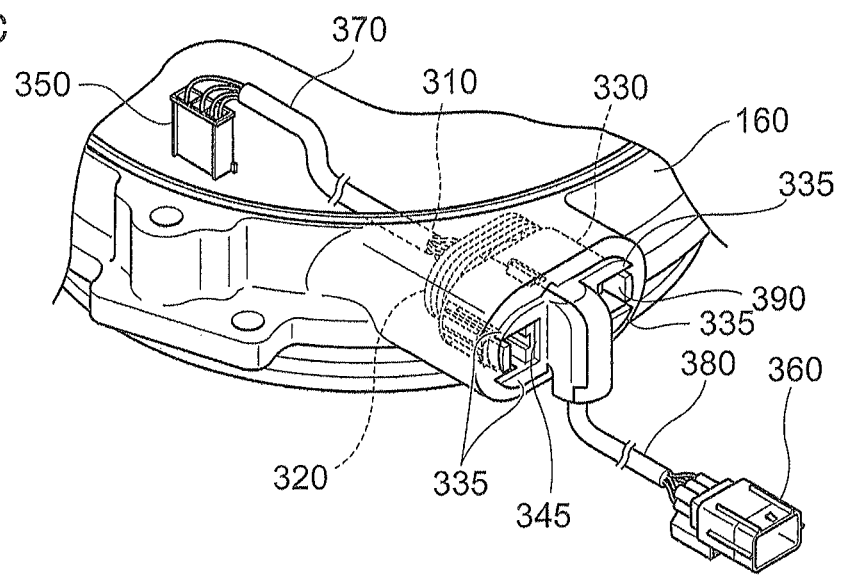
FIG. 16C is a view for illustrating a state where the harness component is mounted on the second housing.

FIG. 16C is a view for illustrating a state where the harness component 300 is mounted on the second housing 160.

The grommet 320 includes an elliptic cylindrical part 321 that is approximately formed into an elliptic cylinder, and a cylindrical part 322 that is formed into a cylinder. In the elliptic cylindrical part 321, electric cable holes 323 are formed in a cylindrical direction for making the electric cables 310 pass therethrough. Here, the number of the electric cable holes 323 is the same as the number of the electric cables 310 (in the exemplary embodiment, four electric cable holes 323 are formed). On the outer peripheral surface of the elliptic cylindrical part 321, plural projections 324 (three projections in the exemplary embodiment) that project from the outer peripheral surface to the outside are provided in the cylindrical direction (hole direction of the electric cable holes 323 (hereinafter, referred to as an "electric cable hole direction" in some cases)) throughout the whole periphery in the peripheral direction. The outermost peripheral part of the projection 324 has larger size than the inner communication hole 161a of the communication hole 161 of the second housing 160. The outer peripheral surface of the elliptic cylindrical part 321 has the same as or a little bit smaller than the inner peripheral surface of a peripheral wall 163 forming the inner communication hole 161a of the communication hole 161 of the second housing 160. Thus, in a state where the grommet 320 is fitted with the second housing 160, by making the projections 324 projecting from the outer peripheral surface to the outside pressed by the peripheral wall 163, the elliptic cylindrical part 321 as a whole elastically deforms to the inner side. Accordingly, the grommet 320 seals the inner communication hole 161a of the communication hole 161 of the second housing 160, and presses the electric cables 310 inserted into the electric cable holes 323 at a peripheral parts of the electric cable holes 323, which suppresses movement of the electric cables 310. Note that, the grommet 320 is formed by vulcanizing an elastic material such as rubber, and formed into the aforementioned shape.

The socket 330 has a pair of opening and closing components that has a penetration hole 331 for making the electric cables 310 pass through the inside thereof, that is joined by a hinge and that opens and closes the penetration hole 331 by relative rotation. That is, the socket 330 is configured with a male-side component 410 having a protruding part 411 protruding from the outer surface and a female-side component 420 having a receiving part 421 receiving the tip and portion of the protruding part 411 at the outer side of the outer surface.

On the upper surface of the female-side component 420, a rotary shaft 422 that is formed into a bar and that extends in a front-back direction is provided, and connecting parts 423 that connect the ends of the rotation shaft 422 and the upper surface are respectively provided at the both ends of the rotary shaft 422. On the other hand, on the upper surface of the male-side component 410, a bearing 412 that is fitted with the rotary shaft 422 of the female-side component 410 is provided. As mentioned above, the male-side component 410 and the female-side component 420 are joined by a hinge, and the male-side component 410 is rotatable about the rotary shaft 422 of the female-side component 420, with respect to the female-side component 420.

In the male-side component 410 and the female-side component 420, side surfaces are respectively provided, the side surfaces facing each other when the male-side component 410 and the female-side component 420 are connected by inserting the protruding part 411 of the male-side component 410 into the receiving part 421 of the female-side component 420. Hereinafter, the side surface of the male-side component 410 is referred to as a male-side side surface 415, and the side surface of the female-side component 420 is referred to as a female-side side surface 425.

The protruding part 411 of the male-side component 410 has a lateral section 411a that extends in a lateral direction from the male-side side surface 415 to the female-side component 420 side, and in the tip end of the lateral section 411a, an inclined surface 411b downwardly inclined with respect to the lateral direction, and a vertical surface 411c upwardly extending from the level of the terminal end of the inclined surface 411b to the bottom surface of the lateral section 411a are formed. A concave part 411d is provided around a section where the protruding part 411 is provided on the bottom surface of the male-side component 410.

The receiving part 421 of the female-side component 420 is configured with a downward section (not shown) downwardly extending from the bottom surface of the female-side component 420, and a lateral section 421a extending from the bottom end of the bottom section to the male-side component 410 side in the lateral direction. In the tip end of the lateral section 421a, an inclined surface 421b upwardly inclined with respect to the lateral direction and a vertical surface 421c downwardly extending from the level of the terminal end of the inclined surface 421b to the upper surface of the lateral section 421a are formed. A concave part 421d is provided around a section where the receiving portion 421 is provided on the bottom surface of the female-side component 420.

The protruding part 411 of the male-side component 410 is inserted into a space between the lateral section 421a of the receiving part 421 of the female-side component 420 and the bottom surface, and thereby the male-side component 410 and the female-side component 420 are joined. The male-side component 410 and the female-side component 420 are an example of a pair of joining components, and in the joint state, the vertical surface 411c of the protruding part 411 of the male-side component 410 as an example of one component and the vertical surface 421c of the receiving part 421 of the female-side component 420 as an example of the other component are brought into contact with each other, and thereby rotational movement of the male-side component 410 with respect to the female-side component 420 is suppressed. Thus, the joint state is maintained.

The socket 330 has an outer peripheral surface 334 basically formed into an elliptic cylinder in the state where the male-side component 410 and the female-side component 420 are joined, and the penetration hole 331 for making the plural electric cables 310 bundled by the second cover 380 pass therethrough is formed at the inside and the center thereof. The penetration hole 331 has a cross-section approximately formed into a circle, and is shaped in the length direction so that one direction 331c (refer to FIG. 1B) as a hole direction of one end as the end on the grommet 320 side and the other direction 331d (refer to FIG. 1B) as the hole direction of the other end as the end on the side opposite to the grommet 320 intersect with each other. In the exemplary embodiment, the penetration hole 331 is formed so that the one direction 331c and the other direction 331d are orthogonal to each other. That is, in the case where the one direction 331c is the same as the communication hole direction (electric cable hole direction) and is set to be a horizontal direction, the other direction 331d is the downward direction (refer to FIG. 1B). Further, the penetration hole 331 curves from the one end to the other end like a dogleg so as to head to the other end side after heading to the side opposite to the other end side (refer to FIG. 1B). Furthermore, the penetration hole 331 curves like a mountain having a convexity in a direction opposite to the direction of the electric cables 310 outside the housing 140.

The penetration hole 331 is formed of a male-side penetration hole concave part 331a that is inwardly concave from the male-side side surface 415 of the male-side component 410, and a female-side penetration hole concave part 331b that is inwardly concave from the female-side side surface 425 of the female-side component 420. In the state where the male-side component 410 and the female-side component 420 are joined, the male-side side surface 415 of the male-side component 410 and the female-side side surface 425 of the female-side component 420 do not correspond to the center of the penetration hole 331, and the male-side side surface 415 and the female-side side surface 425 are formed to be located on the male-side component 410 side beyond the center of the penetration hole 331. By this configuration, the size (region) of the female-side penetration hole concave part 331b of the female-side component 420 is larger than the size (region) of the male-side penetration hole concave part 331a of the male-side component 410. The peripheral wall of the male-side penetration hole concave part 331a of the male-side component 410 and the female-side penetration hole concave part 331b of the female-side component 420 has a sharp angle part 330a bent at a sharp angle at the lower section of the penetration hole 331 in the male-side component 410 and the female-side component 420 so that the penetration hole 331 is curved like a dogleg.

The socket 330 is provided with: at both sides in the long side direction of the ellipse on one end surface side (end surface of the grommet 320 side) in the cylindrical direction, two crescent cylindrical parts 332 that projects from the end surface to the outside in the cylindrical direction to form crescent cylinders; and, at the central portion, a cylindrical part 333 that is concave from the end surface to form a cylinder. The crescent cylindrical parts 332 are respectively provided to the male-side component 410 and the female-side component 420. The cylindrical part 333 is formed of a male-side cylindrical part concave part 333a that is inwardly concave from the one end surface in the cylindrical direction in the male-side component 410, and the female-side cylindrical part convex part 333b that is inwardly concave from the one end surface in the cylindrical direction in the female-side component 420.

The size of the outer peripheral surface 334 of the socket 330 formed into a elliptic cylinder is the same as or a little bit smaller than the size of the inner peripheral surface of the peripheral wall 163 forming the outer communication hole 161b of the communication hole 161 of the second housing 160. On the other end of the outer peripheral surface 334 formed into the elliptic cylinder (end on the side opposite to the grommet 320), two protruding parts 335 that outwardly project toward the outside beyond the outer peripheral surface 334 formed into the elliptic cylinder in the lateral direction are provided to each of the male-side component 410 and the female-side component 420.

On the end of the socket 330 on the side opposite to the grommet 320, a guiding part 336 that guides the plural electric cables 310 bundled by the second cover 380 toward the other direction 331d is provided. The guiding part 336 is a wall covering a periphery of the penetration hole 331 from the section following the curve like a dogleg to the section at the other end, and the guiding part 336 is configured with a male-side guiding part 336a of the male-side component 410 and a female-side guiding part 336b of the female-side component 420. In the male-side guiding part 336a of the male-side component 410, a protruding part 336c that protrudes to the central side of the penetration hole 331 to decrease a passage area of the penetration hole 331 is provided. A concave part 336d and a convex part 336e that are fitted with each other when the male-side component 410 and the female-side component 420 are joined are provided respectively to the male-side guiding part 336a and the female-side guiding part 336b.

Additionally, the protruding part 336c of the male-side guiding part 336a of the male-side component 410 is a section protruding from the wall surface forming the penetration hole 331 to the central side of the penetration hole 331, and the cross-sectional shape of the tip end thereof is formed into a circular arc as shown in FIG. 15. A space in the radial direction located between the tip end of the protruding part 336c and the wall surface forming the penetration hole 331 in the female-side guiding part 336b facing the tip end of the protruding part 336c is set to be approximately equal to the size of the electric cable 310. Therefore, the socket 330 presses the electric cables 310 in such a manner that the plural electric cables 310 bundled by the second cover 380 are aligned in the circumferential direction by using the tip end of the protruding part 336c of the male-side guiding part 336a and the wall surface forming the penetration hole 331 in the female-side guiding part 336b when the male-side component 410 and the female-side component 420 are joined. As described above, the protruding part 336c of the male-side component 410 and the wall surface forming the penetration hole 331 in the female-side guiding part 336b function as a pressing part that presses electric cables 310 at the outside of the communication hole 161 of the housing 140.

The size of the penetration hole 331 located between the end on the grommet 320 side and the section (pressing part) of the male-side component 410 where the protruding part 336c is provided is set to be larger than the size of the four electric cables 310, and larger than the outer shape of the second cover 380 bundling the plural electric cables 310. Therefore, the four electric cables 310 bundled by the second cover 380 easily move in the penetration hole 331.

In the sections of the male-side side surface 415 and the female-side side surface 425 on the grommet 320 side, a convex part 415a and the concave part 425a which are fitted with each other when the male-side component 410 and the female-side component 420 are joined are respectively provided. By fitting the convex part 415a and the concave part 425a with each other, the male-side component 410 and the female-side component 420 are prevented from being displaced in surface directions of the male-side side surface 415 and the female-side side surface 425, respectively, when the male-side component 410 and the female-side component 420 are joined.

The socket 330 is provided with hooks 390 that projects from one end side (end on the grommet 320 side) in the cylindrical direction of the elliptic cylindrical outer circumferential surface 334 to the protruding part 335 side in the one direction 331c of the penetration hole 331 and elastically deforms in the long side direction, at the both ends in the long side direction. That is, one hook 390 is provided to each of the male-side component 410 and the female-side component 420. The hook 390 is formed so that the outer surface thereof is formed along the outer peripheral surface 334 formed into the elliptic cylinder. The hook 390 has an inclined surface 391 that is inclined with respective to the communication hole direction so as to project from the outer peripheral surface 334 formed into the elliptic cylinder to the outside, and a surface extending from the terminal end of the inclined surface 391 to the inner side in the long side direction so as to be parallel to the long side direction, that is, a vertical surface 392 that is a surface vertical to the communication hole direction. Two long holes 393 are formed between the leading end of the inclined surface 391 and the aforementioned one end so that the inclined surface 391 and the vertical surface 392 easily deform in the long side direction.

Note that the socket 330 is formed into the aforementioned shape by injection molding by using a resin.

The socket 330 having the aforementioned configuration opens the penetration hole 331 when the protruding part 411 of the male-side component 410 and the receiving part 421 of the female-side component 420 are not joined (as shown in the state of FIG. 14C). In this state, it is possible to press the plural electric cables 310 bundled by the second cover 380 into the female-side penetration hole concave part 331b of the female-side component 420 from the lateral direction. Then, when the protruding part 411 of the male-side component 410 is inserted into the receiving part 421 of the female-side component 420 and thereby the male-side component 410 and the female-side component 420 are joined, the penetration hole 331 is closed. At this time, the plural electric cables 310 bundled by the second cover 380 is pressed by the protruding part 336c provided to the male-side guiding part 336a of the male-side component 410. Also, at this time, the four electric cables 310 are pressed so that the four electric cables 310 in the second cover 380 are aligned in the circumferential direction by the tip end of the protruding part 336c of the male-side guiding part 336a and the wall surface forming the penetration hole 331 in the female-side guiding part 336b, and thereby it is possible to suppress disconnection of the electric cables 310 due to the strong pressing force applied to the electric cables 310.

The harness component 300 having the aforementioned configuration is assembled as follows.

That is, first, electric cables 310 are inserted into the plural electric cable holes 323 formed in the grommet 320, respectively. Then, adhesive agent is applied to the inner side of the cylindrical part 322 of the grommet 320, and positioning is conducted so that the plural electric cables 310 do not move with respect to the grommet 320. In addition, the plural cables 310 are bundled by the first cover 370 and the second cover 380. Thereafter, the one end of the plural electric cables 310 bundled by the first cover 370 is connected to the first connector 350, and the other end of the plural electric cables 310 bundled by the second cover 380 is connected to the second connector 360.

Subsequently, the plural electric cables 310 bundled by the second cover 380 is pressed into the female-side penetration hole concave part 331b of the female-side component 420 in the socket 330 which is in an unjointed state, from the lateral direction. At this time, the plural electric cables 310 bundled by the second cover 380 are pressed so as to be formed along the shape of the penetration hole 331, and the plural electric cables 310 are configured to project from the other end of the penetration hole 331.

Note that, the plural electric cables 310 bundled by the second cover 380 may be pressed into the female-side penetration hole concave part 331b of the female-side component 420 before the end of the plural electric cable 310 bundled by the second cover 380 is connected to the second connector 360.

The harness component 300 is attached to the electric power steering apparatus 100 as follows.

That is, in the state where the first rotary shaft 110, the second rotary shaft 120, the sensing device 10 and the like are attached to the first housing 150 and the second housing 160 before the third housing 170 is attached, the harness component 300 is made to pass into the communication hole 161 formed in the second housing 160, from the first connector 350 side. The grommet 320 and the socket 330 are pressed until the projections 324 of the grommet 320 are brought into contact with and are fitted with the inner peripheral surface of the communication hole 161 and the hooks 390 of the socket 330 are fitted with the concave parts 162 formed in the second housing 160. At this time, the rotary shaft 422 and the connecting part 423 of the female-side component 420 and the bearing 412 of the male-side component 410 that are a hinge joining part of the socket 330 are inserted into the concave part 164 of the second housing 160.

When the socket 330 is inserted into the communication hole 161, the inclined surfaces 391 of the hooks 390 are brought into contact with the peripheral wall of the communication hole 161 in the second housing 160 and elastically deform, and then by further insertion, the inclined surfaces 391 are fitted with the concave parts 162 of the second housing 160, and thereby recovering from the deforming state. The grommet 320 acts against the friction force generated with the peripheral wall 163 of the communication hole 161 and moves to the inner side by making the surface on the side where the cylindrical part 322 of the elliptic cylindrical part 321 is arranged pressed by the crescent cylindrical parts 332 of the socket 330. As described above, the grommet 320 and the socket 330 are mounted on the second housing 160. Further, the first connector 350 is inserted into the connecting terminal 62 provided at the inner side of the flat cable cover 60, and the second connector 360 is inserted into the terminal of the ECU 200.

Meanwhile, in the case where the harness component 300 is detached, after the first connector 350 is detached from the terminal of the flat cable cover 60, the grommet 320 and the socket 330 is detached from the communication hole 161 of the second housing 160 by pulling the hooks 390 of the socket 330 toward the front side from the outside of the second housing 160 while the hooks 390 are elastically deformed to the inner side. Thereafter, the first connector 350 is pulled away from the communication hole 161 of the second housing 160, and the harness component 300 is detached.

In the harness component 300 having the aforementioned configuration and mounted on the second housing 160, as the grommet 320 is fitted with the second housing 160, the inside of the housing 140 is sealed by, mainly the projections 324 of the grommet 320. Further, by making the projections 324 of the grommet 320 pressed by the peripheral wall 163 of the communication hole 161 of the second housing 160, the grommet 320 elastically deforms so that the diameter of the electric cable holes 320 becomes small, and the plural electric cables 310 are more strongly held. The plural electric cables 310 are attached by the adhesive agent applied to the inner side of the cylindrical part 322 of the grommet 320. Further, the plural electric cables 310 bundled by the second cover 380 passing through the penetration hole 331 of the socket 330 are curved like a dogleg at the inside of the socket 330, and project in the downward direction orthogonal to the electric cable hole direction at the outside of the housing 140. Furthermore, the plural electric cables 310 bundled by the second cover 380 are pressed by the protruding part 336c provided to the male-side guiding part 336a of the male-side component 410 at the outside of the housing 140. Thereby, after the attachment, even if any force is applied to the plural electric cables 310 bundled by the second cover 380 from the outside of the housing 140, the force is difficult to be transferred to the section (electric cable holding part) of the grommet 320 where the electric cables 310 are held, and the electric cables 310 is inhibited from moving from the grommet 320.

For example, even if the plural electric cables 310 bundled by the second cover 380 is pulled in the one end direction of the shaft direction (downward direction in FIGS. 1A and 1B) at the outside of the housing 140, since the electric cables 310 are pressed by the protruding part 336c of the male-side component 410 of the socket 330, the electric cables 310 are difficult to move with respect to the socket 330. Further, even if the electric cables 310 move in the one end direction of the shaft direction (downward direction in FIGS. 1A and 1B) from the socket 330, since the electric cables 310 are pressed by the sharp angle part 330a of the socket 330 at the inside of the socket 330, the force is difficult to be transferred to the section of the grommet 320 where the electric cables 310 are held. Note that, the size of the cylindrical part 322 of the grommet 320 in the radial direction is set so as to have a space with the inner sides of the crescent cylindrical parts 332 and the cylindrical part 333 of the socket 330, and the cylindrical part 333 is located in the electric cable hole direction of the cylindrical part 322. Thereby, the diameter of the electric cable holes 323 of the grommet 320 becomes small, and it is acceptable that the grommet 320 elastically deforms so as to become large in the electric cable hole direction.

Further, by bringing the vertical surfaces 392 of the hooks 390 of the socket 330 into contact with the vertical surfaces 162a of the concave part 162 of the second housing 160, the socket 330 and the grommet 320 are inhibited from dropping from the second housing 160. Accordingly, even if any force is applied to the plural electric cables 310 bundled by the second cover 380, from the outside of the housing 140, the grommet 320 is difficult to drop from the communication hole 161, and thereby the electric cables 310 are inhibited from dropping from the first connector 350 and the connecting terminal 62 where the first connector 350 has been inserted is inhibited from being broken.

As mentioned above, the four electric cables 310 bundled by the second cover 380 easily move between the end on the grommet 320 side and the section (pressing part) of the male-side component 410 where the protruding part 336c is provided in the penetration hole 331 of the socket 330. Thereby, even if the harness component 300 is assembled in the state where the plural electric cables 310 have phase shifting in the circumferential direction of the electric cables 310 (the plural electric cables 310 are twisted) between the electric cable holding part of the grommet 320 and the pressing part of the socket 330, and the harness component 300 is mounted on the second housing 160 in this state, the phase shifting of the electric cables 310 in the circumferential direction is cancelled between the electric cable holding part of the grommet 320 and the pressing part of the socket 330. Therefore, even if the harness component 300 is attached in the state where the electric cables 310 are twisted, deterioration of a sealing property between the grommet 320 and the second housing 160 due to movement of the grommet 320 for cancelling the twisting state of the electric cables 310 can be suppressed. Additionally, influence of the force for cancelling the twisting state of the electric cables 310 on the electric cable holding part of the grommet 320 can be reduced, and it is possible to suppress the movement of the electric cables 310 with respect to the grommet 320.

Even if the harness component 300 alone is carried, since the electric cables 310 are held so as not to move with respect to the grommet 320, an operator for attaching the harness component 300 can easily attach the harness component 300 without attention to the length of the electric cables 310 from the grommet 320 to the first connector 350.

Figure 17A:
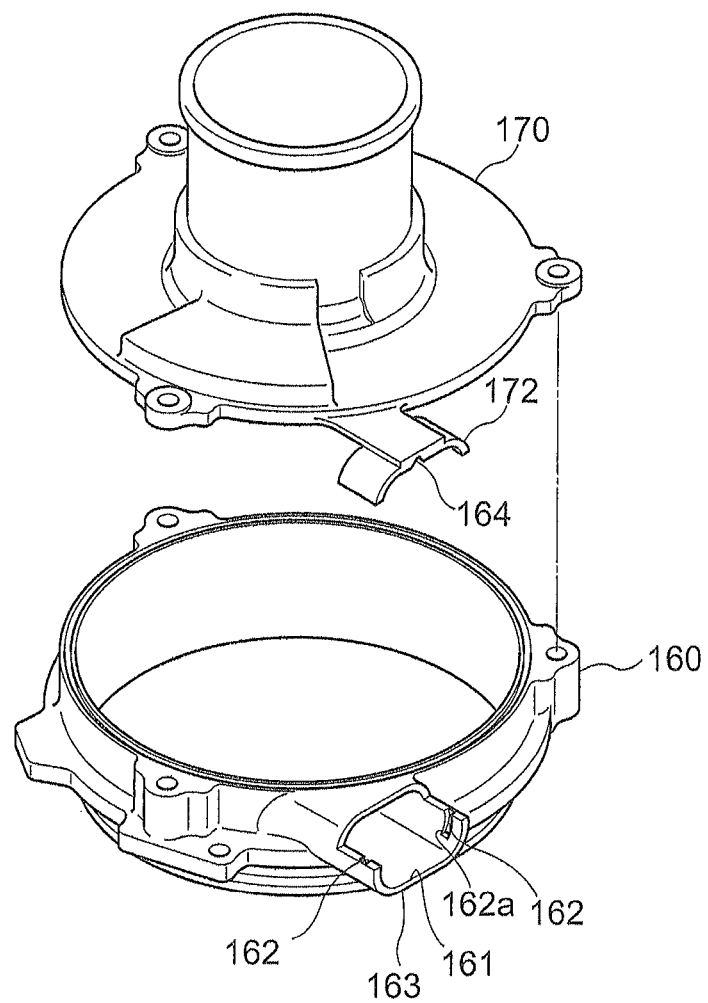
FIGS. 17A and 17B are views for illustrating another configuration of the housing.
Figure 17B:
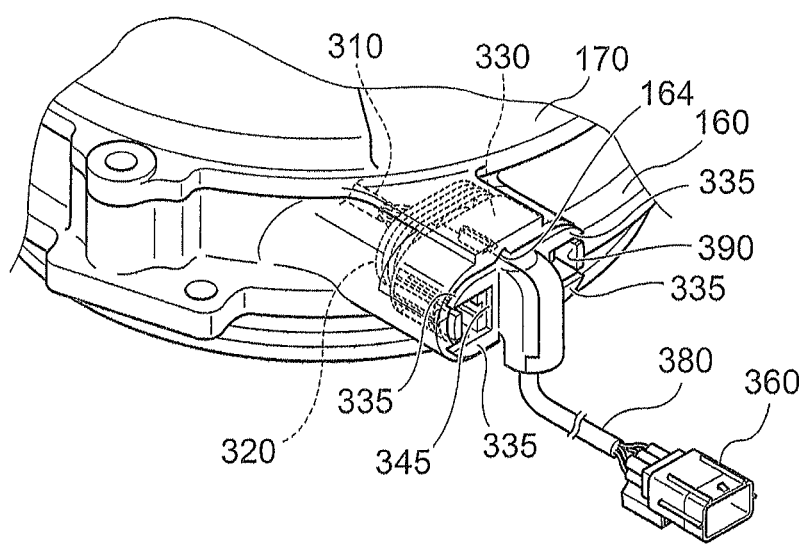

FIGS. 17A and 17B are views for illustrating another configuration of the housing 140.

A part or all of the outer communication hole 161b described with FIGS. 1B and 16A to 16C may be formed by the second housing 160 and the third housing 170 as shown in FIGS. 17A and 17B. In other words, the third housing 170 is fixed to the second housing 160 with bolts, and thereby the outer communication hole 161b may be formed by the second housing 160 and the third housing 170. That is, as shown in FIG. 17A, a wall surface of the outer communication hole 161b in the second housing 160 on the other end side in the shaft direction (upward direction in FIGS. 1A and 1B) is removed, and the outer communication hole 161b is opened. On the other hand, to the third housing 170, an extending part 172 that extends from a fastening surface with the second housing 160 to the outside in the electric cable hole direction is provided. In the extending part 172, a concave part 164 that is concave from a surface forming the outer communication hole 161b of the communication hole 161 is formed.

When the harness component 300 is attached to the electric power steering apparatus 100, after the grommet 320 and the socket 330 are mounted on the second housing 160 and the first connector 350 is inserted into the connection terminal 62 of the flat cable cover 60, the third housing 170 is attached to the second housing 160, similarly to the aforementioned exemplary embodiment. Thereby, as shown in FIG. 17B, the upper surface of the socket 330 is covered by the extending part 172 of the third housing 170.

When the harness component 300 is detached, the upper surface of the socket 330 is opened if the third housing 170 is detached from the second housing 160. Thus, it is possible to easily detach the socket 330 and the grommet 320 from the second housing 160.

Figure 18A:
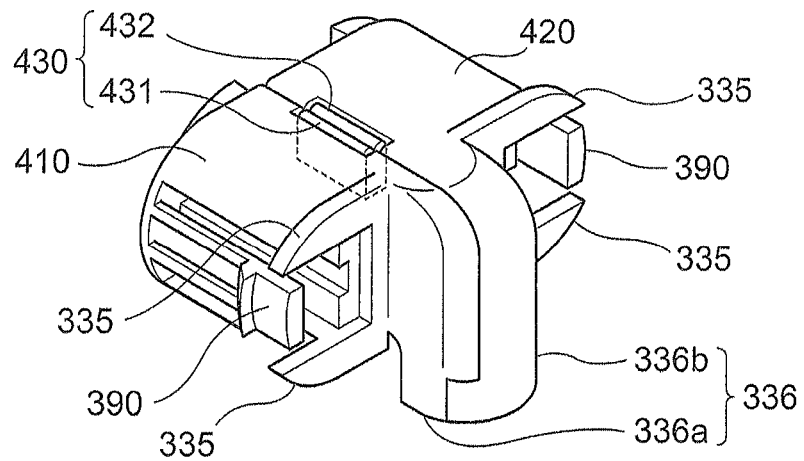
FIGS. 18A to 18C are views for illustrating another configuration of the socket.
Figure 18B:
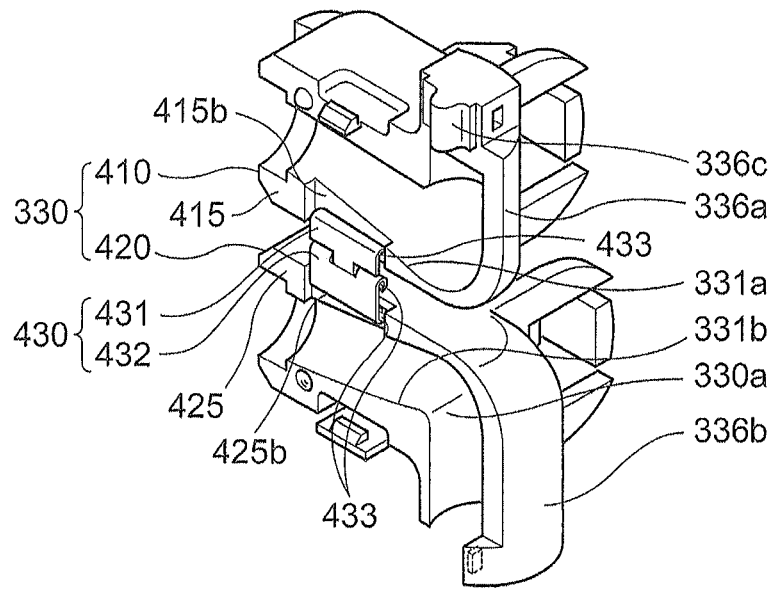
Figure 18C:
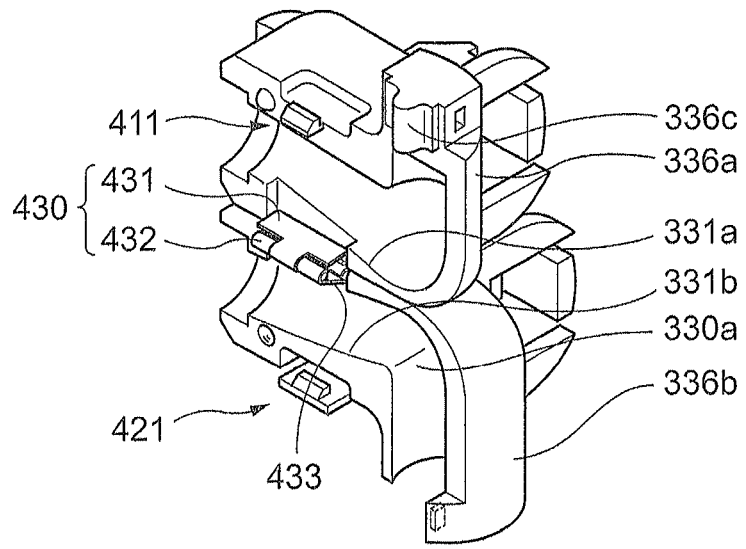

FIGS. 18A to 18C are views for illustrating another configuration of the socket 330. FIG. 18A is a perspective view seen from the second connector 360 side, and FIG. 18B is a view for illustrating an unjointed state of the socket 330. FIG. 18C is a view for illustrating a state between the unjointed state of the socket 330 and the joint state thereof.

The socket 330 according to another configuration has a different hinge joining structure with respect to the socket 330 described with FIGS. 14A to 14C. That is, the male-side component 410 and the female-side component 420 of the socket 330 have a pair of connecting components 430 joined by a hinge, respectively. The male-side component 410 has a male-side connecting component 431 out of the pair of the connecting components 430, and the female-side component 420 has a female-side connecting component 432 out of the pair of the connecting components 430. The male-side component 410 and the male-side connecting component 431 are joined by a hinge through a connecting pin 433, and the female-side component 420 and the female-side connecting component 432 are joined by hinge through the connecting pin 433. Note that, the male-side connecting component 431 and the female-side connecting component 432 are joined by a hinge through the connecting pin 433.

In the socket 330 according to another configuration, when the protruding part 411 of the male-side component 410 is inserted into the receiving part 421 of the female-side component 420 and thereby the male-side component 410 and the female-side component 420 are joined, the pair of the connecting components 430 is contained in an area inside the outer peripheral surface of the socket 330. That is, the male-side connecting component concave part 415b is provided at the section above the penetration hole 331 of the male-side side surface 415 of the male-side component 410, the female-side connecting component concave part 425b is provided at the section above the penetration hole 331 of the female-side side surface 425 of the female-side component 420, and the pair of the connecting components 430 is contained in the space formed by the male-side connecting component concave part 415b and the female-side connecting component concave part 425b.

Figure 19A:
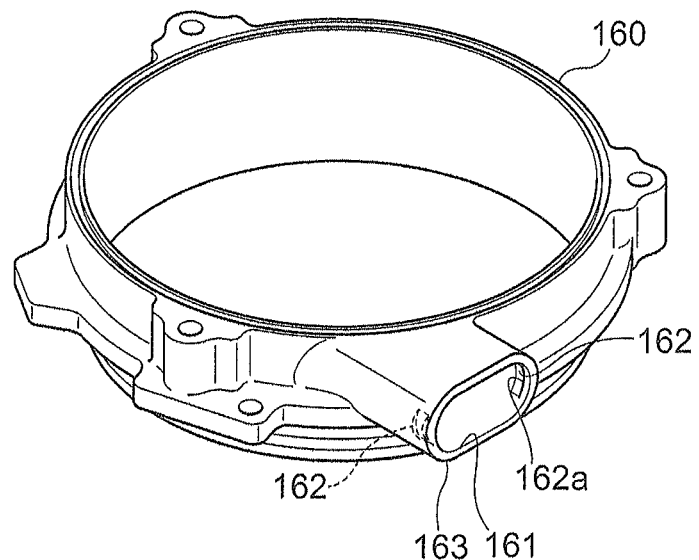
FIG. 19A is a schematic configuration view of another example of the second housing to which the socket according to another configuration is applied.
Figure 19B:
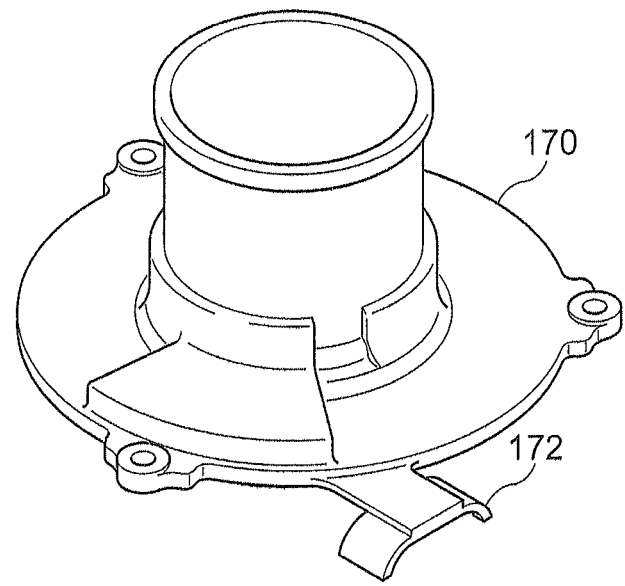
FIG. 19B is a schematic configuration view of another example of the third housing according to another configuration to which the socket according to another configuration is applied.

FIG. 19A is a schematic configuration view of another example of the second housing 160 to which the socket 330 according to another configuration is applied. FIG. 19B is a schematic configuration view of another example of the third housing 170 according to another configuration to which the socket 330 according to another configuration is applied.

In the socket 330 according to another configuration, since the section projecting to the outside of the outer peripheral surface thereof does not exist, it is not necessary to provide the concave part 164 to the second housing 160. Additionally, in the housing 140 according to another configuration described with FIGS. 17A and 17B, it is not necessary to provide the concave part 164 to the third housing 174. Thereby, since the shape of the housing 140 is simplified, it is possible to produce the housing 140 at low cost. That is, in the case where the concave part 164 is necessary to be provided to the second housing 160 or the third housing 170, the concave part 164 is necessary to be formed by a cutting work or a mold. Thus, by adopting the socket 330 in which the concave part 164 is not necessary to be provided, it is possible to achieve easy production at low cost in comparison with the case where the concave part 164 is provided by a cutting work, since the cutting work is not necessary. In addition, it is possible to easily produce a forming die and extend the length of life of the forming die, and thereby it is possible to achieve the production at low cost, in comparison with the case where the concave part 164 is formed in the forming die, since a convex shape for forming the concave part 164 is not necessary to be provided to the forming die.

In the case where the concave part 164 is necessary to be provided and the outer peripheral surface of the peripheral wall 163 forming the communication hole 161 in the second housing 160 does not have asperities, in order to sufficiently secure the wall thickness between the deepest portion of the concave part 164 and the outer peripheral surface, the wall thickness of the section of the peripheral wall 163 where the concave part 164 is not formed is also increased. However, by adopting the socket 330 in which the concave part 164 is not necessary to be provided, since the wall thickness of the peripheral wall 163 forming the communication hole 161 in the second housing 160 is not necessary to be increased more than needs, it is possible to reduce weight of the housing 140 and achieve production at low cost due to reduction of material cost.

Figure 20A:
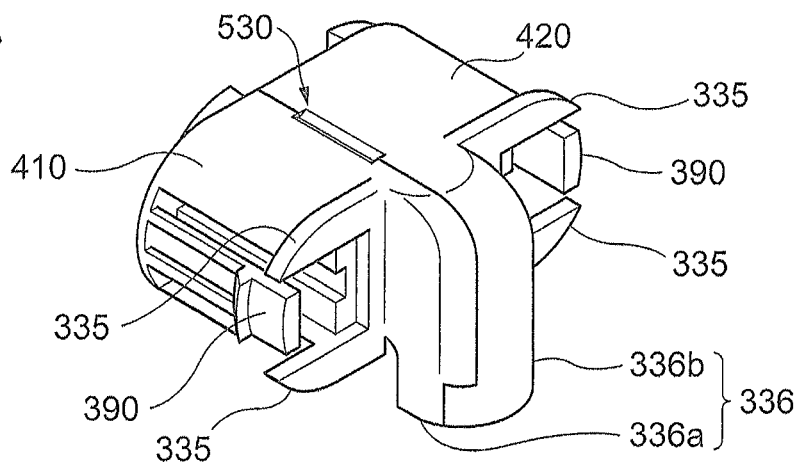
FIGS. 20A to 20C are views for illustrating further configuration of the socket.
Figure 20B:
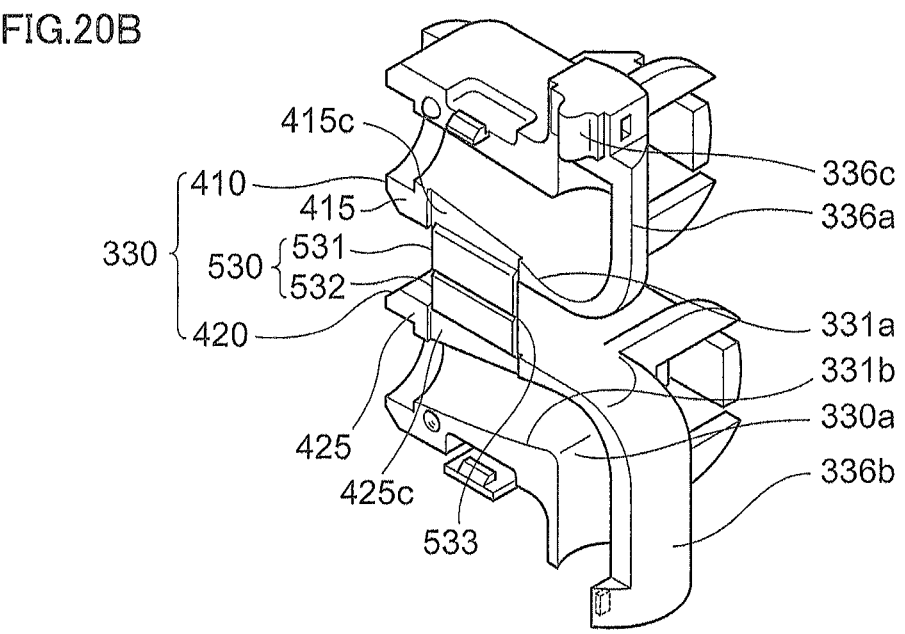
Figure 20C:
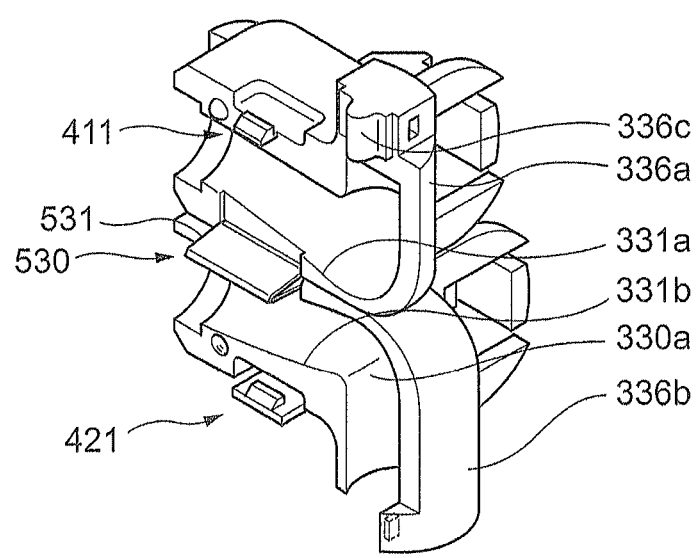

FIGS. 20A to 20C are views for illustrating further configuration of the socket 330. FIG. 20A is a perspective view seen from the second connector 360 side, and FIG. 20B is a view for illustrating the unjointed state of the socket 330. FIG. 20C is a view for illustrating a state between the unjointed state of the socket 330 and the joint state thereof.

The socket 330 according to further configuration differs from the socket 330 according to another configuration described with FIGS. 18A to 18C in that the socket 330 is integrally formed. That is, the male-side component 410 and the female-side component 420 of the socket 330 have a pair of connecting parts 530, respectively. The male-side component 410 has a male-side connecting part 531 out of the pair of the connecting parts 530, and the female-side component 420 has a female-side connecting part 532 out of the pair of the connecting parts 530. The male-side component 410, the female-side component 420 and the pair of the connecting parts 530 are formed as one pair of components, by injection molding.

The general shape of the male-side connecting part 531 and the female-side connecting part 532 is formed into a thin plate. A joint part 533 between the male-side connecting part 531 and the female-side connecting part 532 is formed to be thinner than the section of the general shape in order to fold the male-side connecting part 531 and the female-side connecting part 532 as shown in FIG. 20C, and the outer section on both sides of the joint part 533 in the folding state is formed so that the wall thickness is gradually decreased from the section of the general shape to the joint part 533. That is, in the socket 330 according to further configuration, the male-side connecting part 531 and the female-side connecting part 532 are one section formed into a thin plate in the state shown in FIG. 20B, and at the central part thereof, a V-shaped groove containing the joint part 533 at the bottom is formed.

The joint section between the male-side component 410 and the male-side connecting part 531 is also formed to be thinner than the section of the general shape, and the male-side connecting part 531 arbitrarily and easily changes the angle with respect to the male-side component 410. Similarly, the joint section between the female-side component 420 and the female-side connecting part 532 is also formed to be thinner than the section of the general shape, and the female-side connecting part 532 arbitrarily and easily changes the angle with respect to the female-side component 420.

In the socket 330 according to further configuration, when the protruding part 411 of the male-side component 410 is inserted into the receiving part 421 of the female-side component 420 and thereby the male-side component 410 and the female-side component 420 are joined, the pair of the connecting parts 530 is contained in an area inside the outer peripheral surface of the socket 330. That is, the male-side connecting component concave part 415c is provided at the section above the penetration hole 331 of the male-side side surface 415 of the male-side component 410, the female-side connecting component concave part 425c is provided at the section above the penetration hole 331 of the female-side side surface 425 of the female-side component 420, and the pair of the connecting parts 530 is contained in the space formed by the male-side connecting component concave part 415c and the female-side connecting component concave part 425c.

Also in the socket 330 according to further configuration, since the section projecting to the outside of the outer peripheral surface thereof does not exist, it is not necessary to provide the concave part 164 to the second housing 160. Additionally, in the housing 140 according to another configuration described with FIGS. 17A and 17B, it is not necessary to provide the concave part 164 to the third housing 174. Thereby, since the shape of the housing 140 is simplified, it is possible to produce the housing 140 at low cost. In addition, it is possible to reduce the weight of the housing 140. The reason is as mentioned above.

The socket 330 according to further configuration differs from the socket 330 according to another configuration described with FIGS. 18A to 18C in that the socket 330 is integrally formed, and thereby the connecting pin 433 is not necessary. Thus, it is possible to reduce the number of components and form the socket 330 as a more compact shape.

Further, since the socket 330 according to further configuration is integrally formed, only one forming die is necessary. On the other hand, since the socket 330 according to another configuration described with FIGS. 18A to 18C needs at least one forming die for forming the male-side component 410, and one forming die for forming the female-side component 420, at least two forming dies are necessary. Therefore, by adopting the socket 330 according to further configuration, it is possible to reduce production cost in comparison with the socket 330 described with FIGS. 18A to 18C.

Figure 21A:
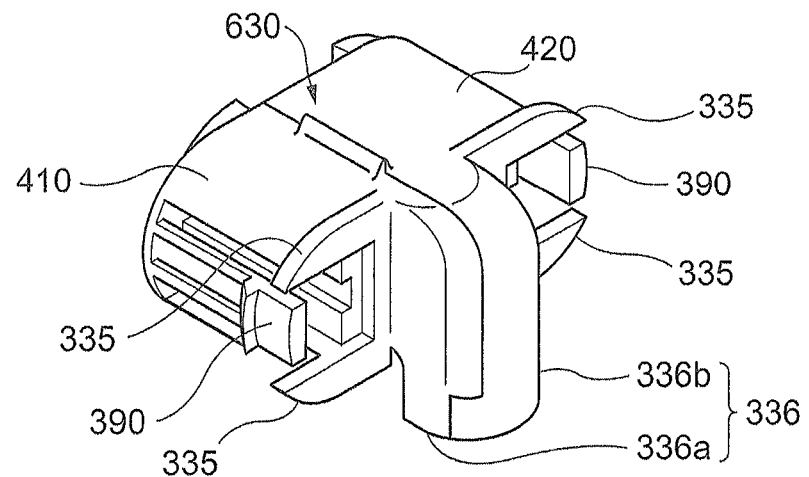
FIGS. 21A and 21B are views for illustrating furthermore configuration of the socket.
Figure 21B:
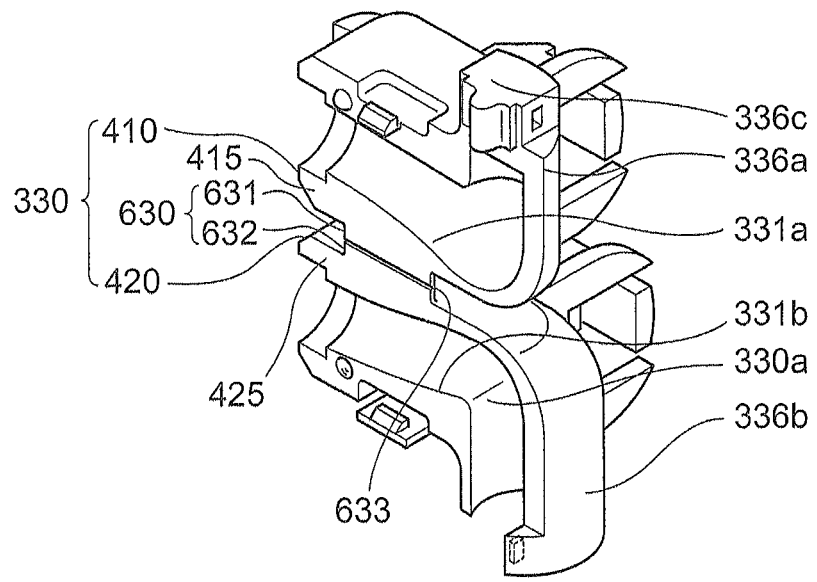

FIGS. 21A and 21B are views for illustrating furthermore configuration of the socket 330. FIG. 21A is a perspective view seen from the second connector 360 side, and FIG. 21B is a view for illustrating an unjointed state of the socket 330.

The socket 330 according to furthermore configuration differs from the socket 330 according to another configuration described with FIGS. 18A to 18C in that the socket 330 is integrally formed. That is, the male-side component 410 and the female-side component 420 of the socket 330 have a pair of connecting parts 630, respectively. The male-side component 410 has a male-side connecting part 631 out of the pair of the connecting parts 630, and the female-side component 420 has a female-side connecting part 632 out of the pair of the connecting parts 630. The male-side component 410, the female-side component 420 and the pair of the connecting parts 630 are formed as one pair of components, by injection molding.

The general shape of the male-side connecting part 631 and the female-side connecting part 632 is formed into a thin plate. A joint part 633 between the male-side connecting part 631 and the female-side connecting part 632 is formed to be thinner than the section of the general shape in order to fold the male-side connecting part 631 and the female-side connecting part 632 as shown in FIG. 21A, and the outer section on both sides of the joint part 633 is formed so that the wall thickness is gradually decreased from the section of the general shape to the joint part 633. That is, in the socket 330 according to furthermore configuration, the male-side connecting part 631 and the female-side connecting part 632 are one section formed into a thin plate in the state shown in FIG. 21B, and at the central part thereof, a V-shaped groove containing the joint part 633 at the bottom is formed.

The socket 330 according to furthermore configuration differs from the socket 330 described with FIGS. 14A to 14C and the socket 330 according to another configuration described with FIGS. 18A to 18C in that the socket 330 is integrally formed, and thereby the connecting pin 433 is not necessary. Thus, it is possible to reduce the number of components and form the socket 330 as a more compact shape. Further, since the socket 330 according to furthermore configuration is integrally formed, only one forming die is necessary, and it is possible to reduce production cost in comparison with the socket 330 described with FIGS. 18A to 18C.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A relative angle sensing device comprising:
    a sensor that is contained in a housing in which a communication hole communicating inside and outside is formed, and outputs an electric signal according to a relative rotation angle between two rotary shafts coaxially arranged;
    an electric cable that transmits the electric signal outputted from the sensor to an apparatus arranged at outside of the housing;
    an electric cable holding member that is fitted with the communication hole of the housing and holds the electric cable; and
    an outer component that is arranged at a position outside the electric cable holding member in the communication hole of the housing, and that has, at inside thereof, a penetration hole through which the electric cable passes, wherein
    the outer component has a pair of opening and closing components that is joined by a hinge and opens and closes the penetration hole by relative rotation.

2. The relative angle sensing device according to claim 1, wherein the penetration hole of the outer component is formed so that a hole direction of one end as an end on an electric cable holding member side and a hole direction of the other end as an end on a side opposite to the electric cable holding member side intersect with each other.

3. The relative angle sensing device according to claim 2, wherein the outer component bends the electric cable passing through the penetration hole at a sharp angle between the one end of the penetration hole and the other end thereof.

4. The relative angle sensing device according to claim 3, wherein
    the outer component has a joining part that is joined by the hinge and projects from an outer peripheral surface to outside, and
    the housing has a concave part into which the joining part of the outer component is inserted, at a periphery of the communication hole.

5. The relative angle sensing device according to claim 3, wherein the opening and closing components of the outer component have a pair of connecting components joined by the hinge, respectively, each of bodies of the opening and closing components and corresponding one of the connecting components are joined by another hinge, and the pair of the connecting components are contained in an area inside the outer peripheral surface of the outer component when the penetration hole is closed by the pair of the opening and closing components.

6. The relative angle sensing device according to claim 2, wherein
    the outer component has a joining part that is joined by the hinge and projects from an outer peripheral surface to outside, and
    the housing has a concave part into which the joining part of the outer component is inserted, at a periphery of the communication hole.

7. The relative angle sensing device according to claim 2, wherein the opening and closing components of the outer component have a pair of connecting components joined by the hinge, respectively, each of bodies of the opening and closing components and corresponding one of the connecting components are joined by another hinge, and the pair of the connecting components are contained in an area inside the outer peripheral surface of the outer component when the penetration hole is closed by the pair of the opening and closing components.

8. The relative angle sensing device according to claim 1, wherein
the outer component has a joining part that is joined by the hinge and projects from an outer peripheral surface to outside, and
the housing has a concave part into which the joining part of the outer component is inserted, at a periphery of the communication hole.

9. The relative angle sensing device according to claim 1, wherein the opening and closing components of the outer component have a pair of connecting components joined by the hinge, respectively, each of bodies of the opening and closing components and corresponding one of the connecting components are joined by another hinge, and the pair of connecting components are contained in an area inside the outer peripheral surface of the outer component when the penetration hole is closed by the pair of the opening and closing components.

10. An electric power steering apparatus comprising:
a sensor that outputs an electric signal according to a relative rotation angle between two rotary shafts coaxially arranged;
a housing in which the sensor is contained and a communication hole communicating inside and outside is formed;
an electric cable that transmits the electric signal outputted from the sensor to an apparatus arranged at outside of the housing;
an electric cable holding member that is fitted with the communication hole of the housing and holds the electric cable; and
an outer component that is arranged at a position outside the electric cable holding member in the communication hole of the housing, and that has, at inside thereof, a penetration hole through which the electric cable passes, wherein
the outer component has a pair of opening and closing components that is joined by a hinge and opens and closes the penetration hole by relative rotation.

11. A relative angle sensing device comprising:
a sensor that is contained in a housing in which a communication hole communicating inside and outside is formed, and outputs an electric signal according to a relative rotation angle between two rotary shafts coaxially arranged;
an electric cable that transmits the electric signal outputted from the sensor to an apparatus arranged at outside of the housing;
an electric cable holding member that is fitted with the communication hole of the housing and holds the electric cable; and
an outer component that is partially inserted into a position outside the electric cable holding member in the communication hole of the housing, and that has, at inside thereof, a penetration hole through which the electric cable passes, wherein
the outer component has a pair of joining components that is joined to form the penetration hole and the pair of the joining components has a pressing part that presses the electric cable at outside of the communication hole of the housing.

12. The relative angle sensing device according to claim 11, wherein the pressing part of the outer component is configured by making the size of the penetration hole partially decreased.

13. The relative angle sensing device according to claim 12, wherein
any one of the joining components of the outer component has a protruding part that protrudes from a wall surface forming the penetration hole to a center of the penetration hole.

14. The relative angle sensing device according to claim 13, wherein
a plurality of the electric cables are provided, and
a tip end of the protruding part provided to one component out of the pair of the joining components of the outer component is formed into a circular arc, the wall surface forming the penetration hole in the other component out of the pair of the joining components is formed into a circular arc, and the pressing part presses the plurality of electric cables so that the plurality of electric cables are aligned in a circumferential direction by the protruding part of the one component and the wall surface of the other component.

15. The relative angle sensing device according to claim 11, wherein
any one of the joining components of the outer component has a protruding part that protrudes from a wall surface forming the penetration hole to a center of the penetration hole.

16. The relative angle sensing device according to claim 15, wherein
a plurality of the electric cables are provided, and
a tip end of the protruding part provided to one component out of the pair of the joining components of the outer component is formed into a circular arc, the wall surface forming the penetration hole in the other component out of the pair of the joining components is formed into a circular arc, and the pressing part presses the plurality of electric cables so that the plurality of electric cables are aligned in a circumferential direction by the protruding part of the one component and the wall surface of the other component.

17. The relative angle sensing device according to claim 11, wherein
a plurality of the electric cables are provided, and
a size of the penetration hole is larger than a total size of the plurality of electric cables at an area between an end of the penetration hole of the outer component on an electric cable holding member side and the pressing part.

18. The relative angle sensing device according to claim 17, wherein
a bundling component that bundles the plurality of electric cables is provided, and
the size of the penetration hole is larger than an outer shape of the bundling component bundling the plurality of electric cables at the area between the end of the penetration hole of the outer component on the electric cable holding member side and the pressing part.

19. An electric power steering apparatus comprising:
a sensor that outputs an electric signal according to a relative rotation angle between two rotary shafts coaxially arranged;
a housing in which the sensor is contained and a communication hole communicating inside and outside is formed;

an electric cable that transmits the electric signal outputted from the sensor to an apparatus arranged at outside of the housing;

an electric cable holding member that is fitted with the communication hole of the housing and holds the electric cable; and an outer component that is partially inserted into a position outside the electric cable holding member in the communication hole of the housing, and that has, at inside thereof, a penetration hole through which the electric cable passes, wherein the outer component has a pair of joining components that is joined to form the penetration hole and the pair of the joining components has a pressing part that presses the electric cable at outside of the communication hole of the housing.

* * * * *